United States Patent
Xi et al.

(10) Patent No.: US 9,851,705 B2
(45) Date of Patent: Dec. 26, 2017

(54) TERMINAL APPARATUS AND METHOD FOR CONTROLLING TERMINAL APPARATUS

(71) Applicant: Lenovo (Beijing) Co., Ltd., Beijing (CN)

(72) Inventors: Zhenxin Xi, Beijing (CN); Cheng Ji, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 356 days.

(21) Appl. No.: 14/583,605

(22) Filed: Dec. 27, 2014

(65) Prior Publication Data
US 2015/0378330 A1 Dec. 31, 2015

(30) Foreign Application Priority Data

Jun. 30, 2014 (CN) .......................... 2014 1 0307657
Sep. 22, 2014 (CN) .......................... 2014 1 0488299

(51) Int. Cl.
*G05B 11/01* (2006.01)
*G05B 13/02* (2006.01)
(Continued)

(52) U.S. Cl.
CPC .............. *G05B 15/02* (2013.01); *H04Q 9/00* (2013.01); *G05B 2219/2642* (2013.01);
(Continued)

(58) Field of Classification Search
CPC . G06F 3/017; G08C 2201/42; G08C 2201/93; H04L 12/282; H04N 21/42222; H04N 5/4403
(Continued)

(56) References Cited

U.S. PATENT DOCUMENTS 6,572,511 B1 * 6/2003 Volpe ................. A63B 71/0622
482/4
8,165,307 B2 4/2012 Wong
(Continued)

FOREIGN PATENT DOCUMENTS

CN 101287300 10/2008
CN 101819486 9/2010
(Continued)

OTHER PUBLICATIONS

First Office Action dated Jul. 21, 2016 out of Chinese priority Application No. 201410307657.2 (15 pages including English translation).
(Continued)

*Primary Examiner* — Michael J Brown
(74) *Attorney, Agent, or Firm* — Brinks Gilson & Lione; G. Peter Nichols

(57) ABSTRACT

A terminal apparatus and a method for controlling a terminal apparatus includes a sensor for collecting user data in real time; a processor for determining whether the user data satisfies a preset control condition, and generating a control instruction if it satisfies the preset control condition, wherein, the control instruction instructs a second terminal apparatus to execute a target operation; and a transmitter transmitting the control instruction to the second terminal apparatus by using a communication link with the second terminal apparatus, so as to facilitate the second terminal apparatus to be able to execute the target operation according to the control instruction. The terminal apparatus and the method for controlling terminal apparatus can make another terminal apparatus to satisfy current requirement of a user by controlling another terminal apparatus by the terminal apparatus without an instruction issued by the user.

12 Claims, 6 Drawing Sheets

(51) Int. Cl.
*G05B 15/02* (2006.01)
*H04Q 9/00* (2006.01)
*G06F 3/01* (2006.01)
*H04L 29/06* (2006.01)
*H04L 12/28* (2006.01)
*H04N 21/422* (2011.01)
*H04N 5/44* (2011.01)

(52) U.S. Cl.
CPC .......... *G06F 3/017* (2013.01); *G08C 2201/42* (2013.01); *H04L 12/282* (2013.01); *H04L 63/126* (2013.01); *H04N 5/4403* (2013.01); *H04N 21/42222* (2013.01); *H04Q 2209/823* (2013.01)

(58) Field of Classification Search
USPC ................................................ 700/11, 28, 76
See application file for complete search history.

(56) References Cited

U.S. PATENT DOCUMENTS

| | | | |
|---|---|---|---|
| 9,253,604 | B2 | 2/2016 | Park |
| 2006/0136173 | A1* | 6/2006 | Case, Jr. ................ A63B 24/00 702/182 |
| 2010/0060569 | A1* | 3/2010 | Shamilian ............. G06F 1/1626 345/156 |
| 2010/0134308 | A1* | 6/2010 | Barnardo ............... G06F 1/3203 340/670 |
| 2014/0267032 | A1* | 9/2014 | Chandel ................ G06F 3/0346 345/158 |
| 2015/0312720 | A1 | 10/2015 | Park |
| 2016/0179197 | A1 | 6/2016 | Qian |

FOREIGN PATENT DOCUMENTS

| | | |
|---|---|---|
| CN | 102881117 | 1/2013 |
| CN | 103491432 | 1/2014 |
| CN | 103744517 | 4/2014 |
| CN | 103870220 | 6/2014 |
| WO | WO 2014107013 | 7/2014 |

OTHER PUBLICATIONS

First Office Action dated Oct. 26, 2016 (20 pages including English translation) out of Chinese priority Application No. 201410488299.X.

Office Action, and English language translation thereof, in corresponding Chinese Application No. 201410307657.2, dated Feb. 23, 2017, 14 pages.

Second Office Action dated Apr. 24, 2017 (22 pages including English translation) out of Chinese priority Application No. 201410488299.X.

* cited by examiner

US 9,851,705 B2

TERMINAL APPARATUS AND METHOD FOR CONTROLLING TERMINAL APPARATUS

This application claims priority to Chinese patent application No. 201410307657.2 filed on Jun. 30, 2014 and Chinese patent application No. 201410488299.X filed on Sep. 22, 2014 the entire contents of which are incorporated herein by reference.

This disclosure relates to field of communication, and more particularly to terminal apparatus and method for controlling terminal apparatus.

BACKGROUND

With popularity and intellectualization of terminal apparatus, requirement of a user to the terminal apparatus become higher. At present, the user can implement control of another terminal apparatus by operating a terminal apparatus; for example, control an audio playback apparatus by operating a remote controller. However, the terminal apparatus can only control another terminal apparatus according to an instruction issued by the user actively, and thus, in some certain scenes, the user may not be able to issue the instruction actively or may not aware of requirement of issuing the instruction. At this time, the terminal apparatus can't control another terminal apparatus according to current status of the user actively to satisfy current requirement of the user, thus user experience is poor.

SUMMARY

This disclosure provides a terminal apparatus and a method for controlling terminal apparatus which can make another terminal apparatus to satisfy the current requirement of the user by controlling another terminal apparatus by the terminal apparatus without the instruction issued by the user.

In a first aspect, there provides a terminal apparatus including: a sensor for collecting user data in real time; a processor for determining whether the user data collected by the sensor satisfies a preset control condition, and generating a control instruction if it determines that the user data collected by the sensor satisfies the preset control condition, wherein, the control instruction is for instructing a second terminal apparatus to execute a target operation; A transmitter for transmitting the control instruction to the second terminal apparatus by using a communication link with the second terminal apparatus, so that the second terminal apparatus is able to execute the target operation according to the control instruction.

In a second aspect, there provides a method for controlling terminal apparatus including: collecting user data in real time; determining whether the collected user data satisfies a preset control conditions; generating a control instruction if the user data satisfies the preset control condition, wherein, the control instruction is for instructing the terminal apparatus to execute a target operation; transmitting the control instruction to the terminal apparatus by using a communication link with the terminal apparatus, so that the terminal apparatus is be able to execute the target operation according to the control instruction.

BRIEF DESCRIPTION OF THE DRAWINGS

In order to explain technical solution in the embodiments of the present disclosure more clear, the accompanying drawings needs to be used in the description of the embodiments of the present disclosure or the prior arts are described simply, it is obvious that the accompanying drawings in the following description are only some embodiments of the present disclosure, and for those skilled in the art, other accompanying drawings can be obtained according to these accompanying drawings without inventive labor.

DETAILED DESCRIPTION

The technical solution in the embodiments of the present disclosure are described clearly and integrated in combination with accompanying drawings in the embodiments of the present disclosure hereinafter, it is obvious that the described embodiments are only part of embodiments of the present disclosure instead of all of the embodiments. All of the other embodiments obtained by those skilled in the art without inventive labor based on embodiments in the present disclosure belong to range sought for protection of the present disclosure.

Figure 1:
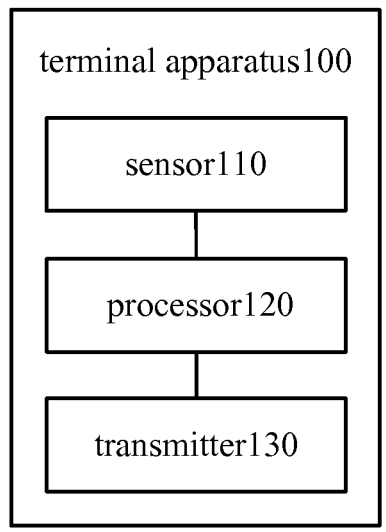
FIG. 1 is a schematic block diagram of a terminal apparatus of a first embodiment of the present disclosure.

FIG. 1 illustrates a terminal apparatus 100 according to the first embodiment of the present disclosure. As shown in FIG. 1, the terminal apparatus 100 includes:

A sensor 110 for collecting user data in real time;

A processor 120 for determining whether the user data collected by the sensor 110 satisfies a preset control condition, and generating a control instruction if it determines that the user data collected by the sensor 110 satisfies the preset control condition, wherein, the control instruction is for instructing a second terminal apparatus to execute a target operation; and A transmitter 130 for transmitting the control instruction to the second terminal apparatus by using a communication link with the second terminal apparatus, so that the second terminal apparatus is able to execute the target operation according to the control instruction.

Therefore, according to the terminal apparatus provided by the first embodiment of the present disclosure, by collecting the user data in real time to monitor current status of the user actively and generating and transmitting the control instruction to the another terminal apparatus when the collected user data satisfies the preset control conditions to instruct the another terminal apparatus to execute the target operation. Thus, another terminal apparatus is able to execute the target operation according to the control instruction to make another terminal apparatus to satisfy current requirement of the user without instruction issued by the user, so as to improve user experience.

The terminal apparatus 100 and the second terminal apparatus may serve a same user at the same time. The sensor 110 can collect the user data actively in real time. Wherein, the user data may include various kinds of data of the user, for example, movement data and/or physiological characteristic data of the user. Wherein, the movement data of the user may include movement procedure data and/or movement result data. Wherein, the movement procedure data includes at least one of the following: velocity of movement, acceleration of movement and action of limb, and so on. The movement result data includes gesture data and/or orientation data, and so on. The physiological characteristic data may include body surface data and/or internal body data. Wherein, the body surface data may include temperature, humidity, and so on. The internal body data may include heart rate and/or blood pressure, and so on. The embodiments do not make restriction thereto.

The processor 120 can determine whether the user data collected by the sensor 110 satisfies the preset control condition, and generate the control instruction corresponding to the preset control condition when the user data satisfies the preset control condition. Wherein, the preset control condition may indicate the current status of the user, and the control instruction instructs the second terminal apparatus to execute the target operation. Wherein, the execution to the target operation of the second terminal apparatus can satisfy the requirement of the second terminal apparatus by the user in the current state, so as to be able to improve the user experience.

In the embodiments, the terminal apparatus 100 may be a module or an independent apparatus which is able to be fixed in a certain system, for example, a vehicle-mounted apparatus, a home intelligent apparatus, or may be a portable apparatus, and the embodiments do not make restriction thereto. In a perspective of function, the second terminal apparatus may be a power control apparatus, a temperature control apparatus, a multimedia control apparatus or the like, and the embodiments do not make restriction thereto.

As an alternate embodiment, the sensor 110 may be specifically for collecting the movement data and/or the physiological characteristic data of the user. Correspondingly, the processor 120 may be specifically for determining whether the movement data and/or the physiological characteristic data collected by the sensor 110 satisfy a first preset control condition, and generating a first control instruction corresponding to the first preset control condition when the movement data and/or the physiological characteristic data collected by the sensor 110 satisfy the first preset control condition. Wherein, the first preset control condition indicates that the user is doing exercise, for example, running, riding bicycle, playing ball, and so on. For example, the first preset control condition includes: velocity of movement of at least one part of body of the user exceeds a certain preset threshold and/or acceleration of movement of at least one part of the body of the user exceeds a certain preset threshold, and heart rate of the user exceeds a certain preset threshold and/or blood pressure exceeds a certain preset threshold, and the embodiments do not make restriction thereto. At this time, if the second terminal apparatus includes a multimedia player and a volume controller, that is, the second terminal apparatus is a multimedia control apparatus, then the first control instruction may be specifically for instructing the second terminal apparatus to control volume played according to the first control instruction. For example, the first control instruction is for instructing the second terminal apparatus to increase the volume played from a current volume to a target volume and/or control the volume played in a range of the volume played specified by the first control instruction, and the embodiments do not make restriction thereto. Thus, the user is made to hear the multimedia, e.g., the music played by the second terminal apparatus clearly in procedure of exercise, and potential safety hazard caused by oversized volume of the multimedia played by the second terminal apparatus can be avoided.

And, if the second terminal apparatus includes a microphone and a SIM card, that is, the second terminal apparatus has communication function, for example, a mobile phone or a tablet computer, then the first control instruction may instruct the second terminal apparatus to set an incoming call as shake, or instruct the second terminal apparatus to increase the volume of ringing of the incoming call and/or control the volume of ringing of the incoming call above a undermost value of volume played specified by the first control instruction, and the embodiments do not make restriction thereto. Thus, the user is made to hear the incoming call in the procedure of exercise, which avoids missing call due to a relatively small volume of ring of the incoming call, so as to improve the user experience.

Alternatively, as another example, the sensor 110 may be specifically for collecting the physiological characteristic data of the user, and the processor 120 may be specifically for generating a second control instruction corresponding to a second preset control condition when the physiological characteristic data collected by the sensor 110 satisfies the second preset control condition. Wherein, the second preset control condition may indicate that the user is sleeping. For example, the second preset control condition may include at least one of the following conditions: times of wink of the user in unit time is lower than a certain threshold, heart rate of the user is in a range of preset value of heart rate and blood pressure of the user is in a range of preset value of blood pressure. Wherein, the range of preset value of heart rate can adopt default setting, or be set by the user in advance, or be determined by value of heart rate in non-sleep status of the user by statistic of the processor 120. Similarly, the range of preset value of pressure value can be set by the user in advance, or be determined by value of pressure value in non-sleep status of the user by statistic of the processor 120, and the embodiments do not make restriction thereto.

At this time, if the second terminal apparatus includes a multimedia player and a volume controller, that is, the second terminal apparatus is a multimedia control apparatus, then the second control instruction may be specifically for instructing the second terminal apparatus to control volume played according to the second control instruction. For example, the second control instruction is for instructing the second terminal apparatus to decrease the volume played from a current volume to a target volume and/or control the volume played below an uppermost volume played specified by the second control instruction. Wherein, alternatively, the target volume may be zero, that is, the second control instruction instructs the second terminal apparatus to stop playing, and the embodiments do not make restriction thereto. And, if the second terminal apparatus includes the microphone and the SIM microphone, that is, the second terminal apparatus has the communication function, for example, a mobile phone or a tablet computer, then the second control instruction may instruct the second terminal apparatus to enter a no disturb status, for example, to set as mute or shake of incoming call, or instruct the second terminal apparatus to decrease the volume of ringing of the incoming call and/or control the volume of ringing of the incoming call below an uppermost value of volume played specified by the second control instruction, or instruct the second terminal apparatus to reply the incoming call automatically, and so on, and the embodiments do not make restriction thereto. Thus, it can avoid that voice of the second terminal apparatus disturbs the sleep of the user so as to create a good sleeping environment for the user, which is advantageous in improving sleeping quality of the user.

Alternatively, as another example, the sensor 110 may be specifically for collecting body surface data of the user, and the processor 120 may be specifically for generating a third control instruction corresponding to a third preset control condition when the body surface data collected by the sensor 110 satisfies the third preset control condition. Wherein, the body surface data may include body surface temperature data. Correspondingly, the third preset control condition may be specifically: the body surface temperature is in a non-comfortable range, for example, the body surface temperature is lower or higher than a normal body surface temperature. At this time, the second terminal apparatus may include a temperature provider and a temperature controller, that is, the second terminal apparatus is a temperature control apparatus, for example, an air conditioning. At this time, the third control instruction may be for instructing the second terminal apparatus to control output power parameter according to the third control instruction, and the output power parameter may include at least one of the following: temperature, direction and intensity of outputted wind. Wherein, if the output power parameter includes temperature of the outputted wind and/or intensity of the outputted wind, then the third control instruction may be specifically for controlling the output power parameter of the second terminal apparatus in a numerical range specified by the third control instruction or adjusting output of the second terminal apparatus to a numerical value specified by the third control instruction. And, if the output power parameter includes direction of the outputted wind, then the third control instruction may also be for instructing the second terminal apparatus to adjust mode of the outputted wind according to the third control instruction. For example, the mode of the outputted wind is adjusted to a mode of oblique upper side, mode of oblique bottom side or a perpendicular mode, and so on. At this time, the second terminal apparatus can adjust direction of blades according to the third control instruction, to make the direction of the outputted wind to be corresponding to the mode indicated by the third control instruction, and the embodiments do not make restriction thereto. Thus, it can create a good temperature environment for the user, which is advantageous in improving comfortable feeling of the user.

Alternatively, as another example, the sensor 110 may be specifically for collecting wrist movement data of the user. At this time, the processor 120 may be specifically for determining whether the wrist movement data collected by the sensor 110 satisfies a fourth preset control condition, and generating a fourth control instruction corresponding to the fourth preset control condition when the wrist movement data satisfy the fourth preset control condition. Wherein, the fourth preset control condition may indicate that the user is driving a transport appliance, for example, a car, a plane, and so on. In particular, the fourth preset control condition may include: a movement track of the wrist with respect to the body is an arc shape or similar to the arc shape and difference between radius of the arc or similar arc and a preset radius does not exceed a preset threshold, wherein, the preset radius may be radius of a steering wheel of the transport appliance driven by the user, or the fourth preset control condition further includes that velocity of movement of the wrist exceeds a certain threshold and/or acceleration of movement of the wrist exceeds a certain threshold, and the embodiments do not make restriction thereto.

Alternatively, as another example, the terminal apparatus 100 may be a driving direction controller or a part of the driving direction controller and the driving direction controller may be a steering wheel. At this time, the sensor 110 is specifically for collecting the movement data of a holding body of the terminal apparatus, and the processor 120 is specifically for determining whether the movement data collected by the sensor 110 satisfies the preset control condition, and generating the fourth control instruction when the movement data satisfies the fourth preset control condition. The fourth preset control condition may include: a movement track of the holding body is in an arc shape or a similar arc shape, and difference between radius of the arc or the similar arc and a preset radius does not exceed a preset threshold, wherein, the preset radius may be radius of the driving direction controller, and the embodiments do not make restriction thereto.

Thus, by collecting the user data, the terminal apparatus can recognize a driver to distinguish the driver from passengers, so as to be advantageous in providing better service to the driver.

At this time, the second terminal apparatus may be a transport appliance driven by the user or a vehicle-mounted apparatus on the transport appliance. In particular, the second terminal apparatus may be connected to a third terminal apparatus and the third terminal apparatus includes a driving power provider, receiver and controller, for example, the third terminal apparatus is a vehicle, and the second terminal apparatus is a vehicle-mounted apparatus. Alternatively, if the second terminal apparatus includes a multimedia player and a volume controller, that is, the second terminal apparatus is a vehicle-mounted playback apparatus, then the fourth control instruction may be specifically for instructing the second terminal apparatus to control volume played according to the fourth control instruction. For example, the fourth control instruction for instructing the second terminal apparatus to control the volume played in a range of volume played specified by the fourth control instruction. Thus, the user is made to hear the multimedia, e.g., the music played by the second terminal apparatus clearly in procedure of driving, and potential safety hazard caused by being not able to recognize other sound clearly due to oversized volume of the multimedia played by the second terminal apparatus can be avoided. Alternatively, as another example, if the second terminal apparatus includes the SIM card and the microphone, that is, the second terminal apparatus has the communication function, for example, the mobile phone or the tablet computer, and then the fourth control instruction may instruct the second terminal apparatus to set as mute mode or earphone mode. Wherein, in earphone mode, the user is connected with the second terminal apparatus through a wired or wireless earphone to communicate with other party of the communication. Thus, it can avoid potential danger on security caused by the user dialing phone call with hand during long time in procedure of driving.

Alternatively, as another example, the second terminal apparatus may also be a transport appliance driven by the user, and at this time, the second terminal apparatus includes:

A driving power provider for at least providing power to movement of the second terminal apparatus;

A receiver for receiving a control instruction;

A controller for controlling the second terminal apparatus according to the control instruction received by the receiver;

At this time, the control instruction generated by the processor 120 may be for instructing the controller to control power output parameter of the second terminal apparatus. Thus, it can create a good driving environment for the user, which improves driving experience of the user.

Alternatively, as another example, the control instruction generated by the processor 120 may also be for instructing the controller to control power output parameter of the second terminal apparatus according to the control instruction. Wherein, the power output parameter may include driving velocity and/or driving velocity threshold. For example, the control instruction may specifically instruct the second terminal apparatus to increase or decrease the driving velocity, or limit an uppermost and/or an undermost driving velocity of the second terminal apparatus. Wherein, the uppermost and/or undermost driving velocity may be default setting, or set by the user in advance, or determined by position at which the user is currently, and the embodiments do not make restriction thereto. Thus, the second terminal apparatus is made to run in a suitable driving velocity, which avoids safety problem caused by too fast and/or too slow driving velocity and is advantageous in insuring human body security of a driver.

Alternatively, as another example, the sensor 110 may also be specifically for collecting the physiological characteristic data of the user in real time. The processor 120 is specifically for determining whether the physiological characteristic data collected by the sensor 110 satisfies the preset control condition, and the preset control condition indicates that the current physiological characteristic of the user is not suitable for controlling the driving power provider independently. The processor 130 is further for generating a control instruction of the power output parameter if it determines that the physiological characteristic data satisfies the preset control condition, and the control instruction of the power output parameter is for instructing the driving power provider to adjust power outputted from a current first value to a second value, wherein, the first value is larger than the second value; and/or instructing the driving power provider control the power outputted with a third value specified by the control instruction of the power output parameter.

Alternatively, the first value may be a current driving velocity of the second terminal apparatus, and the second value may be a target driving velocity indicated by the control instruction of the power output parameter, wherein, the second value is less than the first value, and the second value may be zero, that is, the control instruction of the power output parameter instruct the second terminal apparatus to execute operation of decreasing velocity or stopping driving. The third value may be for limiting the uppermost driving velocity of the second terminal apparatus, and the embodiments do not make restriction thereto. At this time, after the second terminal apparatus receives the control instruction of the power output parameter, if the control instruction of the power output parameter instruct the second terminal apparatus to adjust the outputted power to the second value, then the second terminal apparatus may firstly determine whether the current driving velocity is consistent with the second value indicated by the control instruction of the power output parameter. If they are coincident, then the second terminal apparatus may still be driven in the current driving velocity without adjusting the outputted power. And if the control instruction of the power output parameter instructs the second terminal apparatus to control the power output parameter within the third value, the second terminal apparatus may also determine whether the current driving velocity is within the third value. If the current driving velocity exceeds the third value, then the second terminal apparatus may adjust the outputted power, to adjust the outputted power (i.e., driving velocity) within the third value. And if the current driving velocity of the second terminal apparatus is within the third value, then the second terminal apparatus may not adjust the outputted power, and control the driving velocity within the third value in procedure of subsequent driving, and the embodiments do not make restriction thereto.

In particular, the preset control condition may include at least one of the following conditions: the heart rate is higher than a first threshold, the heart rate is lower than a second threshold, the blood pressure is higher than a third threshold and the blood pressure is lower than a fourth threshold. Wherein, the first threshold may be higher than the second threshold, and the third threshold may be higher than the fourth threshold. Wherein, if the heart rate of the user is higher than the first threshold and/or the blood pressure is higher than the third threshold, it indicates that the user is not comfortable currently and he is not suitable for driving or driving a transport appliance independently, for example, an outburst sickness or the like. Or, if the heart rate of the user is lower than the second threshold and/or the blood pressure is lower than the fourth threshold, it indicates that the user is driving in fatigue currently and he is not suitable for driving or driving a transport appliance independently. At this time, the control instruction may be for instructing the driving power provider to decrease the outputted power, to decrease the driving velocity of the second terminal apparatus, or control a driving power within the third value, to avoid that the driving velocity of the second terminal apparatus exceeds a certain threshold. Thus, it can avoid a potential safety hazard caused by the user driving when he is not suitable for driving or driving the transport appliance independently, which is advantageous in ensuring human security of the user and improving the user experience.

In particular, if the terminal apparatus 100 is specifically the driving direction controller or a part of the driving direction controller, at this time, sensor 110 is specifically for collecting the movement data and the physiological characteristic data of the holding body of the terminal apparatus, and the processor 120 is specifically for determining whether the movement data and the physiological characteristic data collected by the sensor 110 satisfy the preset control condition and generating the control instruction of the power output parameter when the movement data and the physiological characteristic data satisfy the preset control condition. The control instruction of the power output parameter is for instructing the driving power provider to adjust the outputted power from the current first value to the second value, wherein, the first value is larger than the second value, and/or instructing the driving power provider to control the outputted power within the third value specified by the control instruction of the power output parameter.

Wherein, the preset control condition may include: the movement track of the holding body is in arc shape or a similar arc shape, and difference of the arc or the similar arc and the preset radius does not exceed the preset threshold. Wherein, the preset radius may be the radius of the driving direction controller, and the embodiments do not make restriction thereto.

The terminal apparatus controls the second terminal apparatus by collecting the user data, as compared to collecting data of an environment where the terminal apparatus is, the user data can indicate the current status of the user more accurately, so as to make the second terminal apparatus to satisfy the current requirement of the user better and improve the user experience.

A communication link can be established between the terminal apparatus 100 and the second terminal apparatus, and the terminal apparatus 100 and the second terminal apparatus can communicated with the established communication link. Wherein, alternatively, before transmitting the control instruction to the second terminal apparatus, the transmitter 130 may be also for establishing a short distance wireless communication connection with the second terminal apparatus. Wherein, the short distance wireless communication connection may be implemented based on bluetooth technique or other short distance wireless communication technique. The communication link may be established in advance, or may be established immediately before the transmitter 130 transmitting the control instruction, and the embodiments do not make restriction thereto.

Further, the transmitter 130 may transmit the control instruction to the second terminal apparatus through multiple ways. Alternatively, the transmitter 130 may uni-broadcast the control instruction to the second terminal apparatus, or may broadcast the control instruction on a specific frequency band. Wherein, the second terminal apparatus can receive the control instruction on the specific frequency band. At this time, the terminal apparatus can control a plurality of other terminal apparatus, and the embodiments do not make restriction thereto.

Alternatively, as another example, after determining that the user data satisfies the preset control condition, the processor 120 is further for determining the second terminal apparatus corresponding to the preset control condition. Wherein, alternatively, the processor 120 may search the terminal apparatus corresponding to the preset control condition, and determine the searched terminal apparatus as the second terminal apparatus. Correspondingly, the transmitter 130 may establish the communication link with the second terminal apparatus determined by the processor 120. Or, the processor 120 may establish the communication link with a plurality of other terminal apparatus in advance, and determine the second terminal apparatus corresponding to the preset control condition among the plurality of other terminal apparatus. Correspondingly, the transmitter 130 may transmit the control instruction to the second terminal apparatus directly on the established communication link, and the embodiments are not limited thereto.

Alternatively, the terminal apparatus 100 may be a wearable type apparatus. At this time, the terminal apparatus 100 may include: a core piece and a fixing piece. Wherein, the sensor 110, the processor 120 and the transmitter 130 are distributed in the fixing piece and/or the core piece. The fixing piece is for maintaining a relative position relationship between the core piece and at least a part of the body of the user.

The core piece may include core function components of the terminal apparatus 100, for example, the processor 120. The core piece is for implementing most of core functions of the terminal apparatus 100. The fixing piece is for fixing the terminal apparatus 100 at a certain part of the body, for example, fixing to head, neck, wrist or ankle or the like. For example, the terminal apparatus 100 is a head-mounted type terminal apparatus, and the fixing piece is specifically for maintaining the relative position relationship between the terminal apparatus and the head of the body. Or the terminal apparatus 100 is a wrist-band type terminal apparatus, and the fixing piece is specifically for maintaining the relative position relationship between the terminal apparatus and the wrist of the body, and so on. Alternatively, the fixing piece may be a band shape, a ring shape, a chain shape or a bonded piece, and the embodiments do not make restriction thereto.

As an alternate example, the terminal apparatus 100 may be a watch or a hand ring. At this time, the fixing piece at least has a fixing status, and in the fixing status, the fixing piece is be able to be as at least a part of an annular space or at least a part of approximate annular space satisfying a first predetermined condition, the annular space or the approximate annular space can surround periphery of a columnar body satisfying a second predetermined condition.

In the fixing status, the fixing piece may be as an annular space itself, or may be as a part of the annular space, i.e., the annular space having an opening. At this time, the core piece may form a closed annular space together with the fixing piece. For example, the terminal apparatus is a watch, and a dial plate, i.e., the core piece and a watchband, i.e., the fixing piece of the terminal apparatus form a closed annular space together. Or, the fixing piece is able to be as an approximate annular space satisfying the first predetermined condition or a part of the approximate annular space. Wherein, the first predetermined condition may include: the opening is less than a caliber of the columnar body. The columnar body may be specifically the wrist, correspondingly, the second predetermined condition may include: a diameter of the columnar body is less than a diameter of the annular space or the approximate annular space, and a caliber of a part of the columnar body is less than a caliber of another part of the columnar body, and the first predetermined condition and the second predetermined condition can be determined according to practical requirement, and the embodiments do not make restriction thereto.

Further, the fixing piece may only have the fixing status, for example, the terminal apparatus is a hand ring with fixed shape. Or the fixing piece also has a non-fixing status other than the fixing status, and in the non-fixing status, the fixing piece may be a bent band shape, for example, the terminal apparatus is the watch, and the embodiments are not limited thereto.

As another alternate example, the terminal apparatus 100 may also be glasses which may include a mirror holder as the fixing piece and eyeglasses as the core piece. At this time, the fixing piece includes at least a first portion, a second portion and a third portion. The fixing piece at least has the fixing status, and in the fixing status, an accommodation space is formed between the first portion and the second portion, and the first portion, the second portion and the third portion can fix the terminal apparatus at periphery of an object satisfying the third predetermined condition.

In particular, the first portion and the second portion may be a symmetrical similar L shape structure, and the third portion may have a function of supporting the first portion and the second portion. The third predetermined condition may include: including three faces having protrusions respectively and the protrusions on the three faces are coupled with the first portion, the second portion and the third portion respectively. For example, the object is the head, and the head includes a front face and two side faces, and a protrusion, i.e., nose is on the front face, and two protrusions, i.e., ears are on the two side faces, and the embodiments are not limited thereto.

The fixing piece may also have non-fixing status, and in the non-fixing status, the first portion and the second portion of the fixing piece are movable.

Alternatively, as another example, the sensor 110 includes:

A first sensor for collecting spatial parameter data of the terminal apparatus by sensing and using the collected spatial parameter data as the movement data of the user; and/or A second sensor provided on a side facing the user and for collecting the physiological characteristic data of the user directly by sensing.

In particular, the first sensor is for collecting the spatial parameter data itself by using a sensing technique and determining data movement of the user according to the collected spatial parameter data of itself. For example, the first sensor senses an acceleration of itself, and use the sensed acceleration of itself as the acceleration of the user. The second sensor is provided at one side facing the user, for example, a side closer to the wrist of the watch or the hand loop, or a side closer to the face of the glasses or the like, and collects the physiological characteristic data of the user by the sensing technique directly, and the embodiments are not limited thereto.

If the terminal apparatus is at least part of the driving direction controller, then the second sensor may be provided at an outer surface of the driving direction controller. If the terminal apparatus includes the fixing piece, and the fixing piece forms at least a part of the annular space or at least a part of the approximate annular space in the fixing status, for example, if the terminal apparatus is the watch or the hand ring, and the second sensor may be provided at inner side of the annular space or the approximate annular space, and the embodiments are not limited thereto.

Therefore, according to the terminal apparatus provided by the first embodiment, by collecting the user data in real time to monitor the current status of the user actively and generating and transmitting the control instruction to the another terminal apparatus when the collected user data satisfies the preset control conditions to instruct the another terminal apparatus to execute the target operation. Thus, another terminal apparatus is able to execute the target operation according to the control instruction to make another terminal apparatus to satisfy current requirement of the user without instruction issued by the user, so as to improve user experience.

Figure 2:
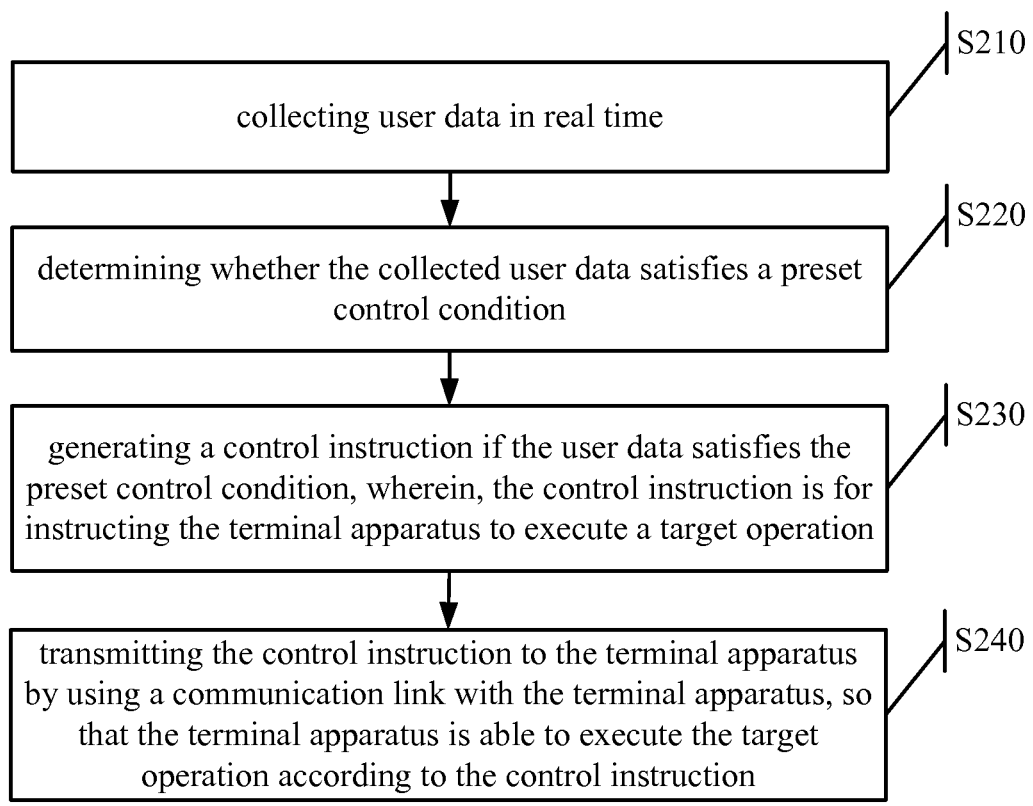
FIG. 2 is a schematic flow chart of a method for controlling terminal apparatus of the first embodiment of the present disclosure.

FIG. 2 illustrates a method for controlling terminal apparatus 200 according to the first embodiment of the present disclosure. The method may be executed by another terminal apparatus. Wherein, the terminal apparatus may be corresponding to the second terminal apparatus in the above example, and the another terminal apparatus may be the terminal apparatus 100, and the embodiments are not limited thereto. As shown in FIG. 2, the method 200 includes:

S210, collecting user data in real time;

S220, determining whether the collected user data satisfies a preset control condition;

S230, generating a control instruction if the user data satisfies the preset control condition, wherein, the control instruction is for instructing the terminal apparatus to execute a target operation;

S240, transmitting the control instruction to the terminal apparatus by using a communication link with the terminal apparatus, so that the terminal apparatus is able to execute the target operation according to the control instruction.

Therefore, according to the method for controlling terminal apparatus provided by the embodiment, by collecting the user data in real time to monitor the current status of the user actively and generating and transmitting the control instruction to the another terminal apparatus when the collected user data satisfies the preset control conditions to instruct the another terminal apparatus to execute the target operation. Thus, another terminal apparatus is able to execute the target operation according to the control instruction to make another terminal apparatus to satisfy current requirement of the user without instruction issued by the user, so as to improve the user experience.

A communication link is between another terminal apparatus and the terminal apparatus. Alternatively, before S240, the method 200 further include: establishing a short distance wireless communication connection with the terminal apparatus. Wherein, the short distance wireless communication connection may be implemented based on blue-tooth technique or other short distance wireless communication technique. In communication link may be established in advance, or may be established immediately before transmitting in control instruction, and the embodiments do not make restriction thereto.

Further, another terminal apparatus may transmit the control instruction to the terminal apparatus through multiple ways. Alternatively, S240 may include: uni-broadcasting the control instruction to the terminal apparatus by using the communication link with the terminal apparatus, or broadcasting the control instruction on a specific frequency band, wherein, the terminal apparatus can receive the control instruction on the specific frequency band. At this time, the terminal apparatus can control a plurality of other terminal apparatus, and the embodiments do not make restriction thereto.

Alternatively, as another example, after determining that the user data satisfies the preset control condition, the method 200 further includes: determining the terminal apparatus corresponding to the preset control condition. Wherein, alternatively, determining the terminal apparatus corresponding to the preset control condition may include: searching a target terminal apparatus corresponding to the preset control condition, and determining the searched target terminal apparatus as the terminal apparatus. At this time, another terminal apparatus may establish the communication link with the terminal apparatus after determining the terminal apparatus. Or, determining the terminal apparatus corresponding to the preset control condition may include: establishing the communication link with a plurality of other terminal apparatus in advance, and determining the terminal apparatus corresponding to the preset control condition among the plurality of other terminal apparatus. At this time, another terminal apparatus may transmit the control instruction to the terminal apparatus directly on the established communication link, and the embodiments are not limited thereto.

Another terminal apparatus and the terminal apparatus may serve a same user at the same time. In S210, the another terminal apparatus may collect the user data actively in real time, wherein, the user data may include various kinds of data of the user, for example, movement data and/or physiological characteristic data of the user. Wherein, the movement data of the user may include movement procedure data and/or movement result data. Wherein, the movement procedure data includes at least one of the following: velocity of movement, acceleration of movement and action of limb, and so on. The movement result data includes gesture data and/or orientation data, and so on. The physiological characteristic data may include body surface data and/or internal body data, wherein, the body surface data may include temperature, humidity or the like, and the internal body data may include heart rate and/or blood pressure or the like, and the embodiments do not make restriction thereto.

The another terminal apparatus may determine whether the collected user data satisfies the preset control condition, and generate the control instruction corresponding to the preset control condition when the user data satisfies the preset control condition. Wherein, the preset control condition may indicate current status of the user, and the control instruction instructs the terminal apparatus to execute a target operation. Wherein, the execution to the target operation of the terminal apparatus can satisfy a requirement of the terminal apparatus by the user in the current status, so as to be able to improve the user experience.

In the embodiments, the another terminal apparatus may be a module or an independent apparatus which is able to be fixed in a certain system, for example, a vehicle-mounted apparatus, a home intelligent apparatus, or may be a portable apparatus, and the embodiments do not make restriction thereto. In a perspective of function, the terminal apparatus may be a power control apparatus, a temperature control apparatus, a multimedia control apparatus or the like, and the embodiments do not make restriction thereto.

As an alternate example, in S210, another terminal apparatus may collect the movement data and/or the physiological characteristic data of the user. Correspondingly, in S220, the another terminal apparatus may determine whether the collected movement data and/or physiological characteristic data satisfy a first preset control condition, and generate a first control instruction corresponding to the first preset control condition when the collected movement data and/or physiological characteristic data satisfy the first preset control condition. Wherein, the first preset control condition indicates that the user is doing exercise, for example, running, riding bicycle, playing ball, and so on. For example, the first preset control condition includes: velocity of movement of at least one part of body of the user exceeds a certain preset threshold and/or acceleration of movement of at least one part of the body of the user exceeds a certain preset threshold, and heart rate of the user exceeds a certain preset threshold and/or blood pressure exceeds a certain preset threshold, and the embodiments do not make restriction thereto. At this time, if the terminal apparatus includes a multimedia player and a volume controller, that is, the terminal apparatus is a multimedia control apparatus, then the first control instruction may be specifically for instructing the terminal apparatus to control volume played according to the first control instruction. For example, the first control instruction is for instructing the terminal apparatus to increase the volume played from a current volume to a target volume and/or control the volume played in a range of the volume played specified by the first control instruction, and the embodiments do not make restriction thereto. Thus, the user is made to hear the multimedia, e.g., the music played by the terminal apparatus clearly in procedure of exercise, and potential safety hazard caused by oversized volume of the multimedia played by the terminal apparatus can be avoided.

And, if the terminal apparatus includes a microphone and a SIM card, that is, the terminal apparatus has a communication function, for example, a mobile phone or a tablet computer, then the first control instruction may instruct the terminal apparatus to set an incoming call as shake, or instruct the terminal apparatus to increase the volume of ringing of the incoming call and/or control the volume of ringing of the incoming call above a undermost value of volume played specified by the first control instruction, and the embodiments do not make restriction thereto. Thus, the user is made to hear the incoming call in the procedure of exercise, which avoids missing call due to a relatively small volume of ring of the incoming call, so as to improve the user experience.

Alternatively, as another example, in S210, another terminal apparatus may collect the physiological characteristic data of the user. Correspondingly, in S230, another terminal apparatus may generate a second control instruction corresponding to a second preset control condition when the physiological characteristic data collected by another terminal apparatus satisfies the second preset control condition. Wherein, the second preset control condition may indicate that the user is sleeping. For example, the second preset control condition may include at least one of the following conditions: times of wink of the user in unit time is lower than a certain threshold, heart rate of the user is in a range of preset value of heart rate and blood pressure of the user is in a range of preset value of blood pressure. Wherein, the range of preset value of heart rate can adopt default setting, or be set by the user in advance, or be determined by value of heart rate in non-sleep status of the user by statistic of the another terminal apparatus. Similarly, the range of preset value of pressure value can be set by the user in advance, or be determined by value of pressure value in non-sleep status of the user by statistic of the another terminal apparatus, and the embodiments do not make restriction thereto.

At this time, if the terminal apparatus includes a multimedia player and a volume controller, that is, the terminal apparatus is a multimedia control apparatus, then the second control instruction may be specifically for instructing the terminal apparatus to control volume played according to the second control instruction. For example, the second control instruction is for instructing the terminal apparatus to decrease the volume played from a current volume to a target volume and/or control the volume played below an uppermost volume played specified by the second control instruction. Wherein, alternatively, the target volume may be zero, that is, the second control instruction instructs the terminal apparatus to stop playing, and the embodiments do not make restriction thereto. And, if the terminal apparatus includes the microphone and the SIM microphone, that is, the terminal apparatus has the communication function, for example, the mobile phone or the tablet computer, then the second control instruction may instruct the terminal apparatus to enter a no disturb status, for example, to set as mute or shake of incoming call, or instruct the terminal apparatus to decrease the volume of ringing of the incoming call and/or control the volume of ringing of the incoming call below an uppermost value of volume played specified by the second control instruction, or instruct the terminal apparatus to reply the incoming call automatically, and so on, and the embodiments do not make restriction thereto. Thus, it can avoid that voice of the terminal apparatus disturbs the sleep of the user so as to create a good sleeping environment for the user, which is advantageous in improving sleeping quality of the user.

Alternatively, as another example, in S210, another terminal apparatus may collect the body surface data of the user. Correspondingly, in S230, another terminal apparatus may generate a third control instruction corresponding to a third preset control condition when the body surface data collected by another terminal apparatus satisfies the third preset control condition. Wherein, the body surface data may include body surface temperature data. Correspondingly, the third preset control condition may be specifically: the body surface temperature is in a non-comfortable range, for example, the body surface temperature is lower or higher than a normal body surface temperature. At this time, the terminal apparatus may include a temperature provider and a temperature controller, that is, the terminal apparatus is a temperature control apparatus, for example, an air conditioning. At this time, the third control instruction may be for instructing the terminal apparatus to control output power parameter according to the third control instruction, and the output power parameter may include at least one of the following: temperature, direction and intensity of outputted wind. Wherein, if the output power parameter includes temperature of the outputted wind and/or intensity of the outputted wind, then the third control instruction may control the output power parameter of the terminal apparatus in a numerical range specified by the third control instruction or adjusting output of the terminal apparatus to a numerical value specified by the third control instruction. And, if the output power parameter includes direction of the outputted wind, then the third control instruction may also be for instructing the terminal apparatus to adjust mode of the outputted wind according to the third control instruction. For example, the mode of the outputted wind is adjusted to a mode of oblique upper side, mode of oblique bottom side or a perpendicular mode, and so on. At this time, the terminal apparatus can adjust direction of blades according to the third control instruction, to make the direction of the outputted wind to be corresponding to the mode indicated by the third control instruction, and the embodiments do not make restriction thereto. Thus, it can create a good temperature environment for the user, which is advantageous in improving comfortable feeling of the user.

Alternatively, as another example, in S210, another terminal apparatus may collect wrist movement data of the user. At this time, the another terminal apparatus may determine whether the wrist movement data collected satisfies a fourth preset control condition, and generating a fourth control instruction corresponding to the fourth preset control condition when the wrist movement data satisfy the fourth preset control condition. Wherein, the fourth preset control condition may indicate that the user is driving a transport appliance, for example, a car, a plane, and so on. In particular, the fourth preset control condition may include: a movement track of the wrist with respect to the body is an arc shape or a similar arc shape and difference between radius of the arc or similar arc and a preset radius does not exceed a preset threshold, wherein, the preset radius may be radius of a steering wheel of the transport appliance driven by the user, or the fourth preset control condition further includes that velocity of movement of the wrist exceeds a certain threshold and/or acceleration of movement of the wrist exceeds a certain threshold, and the embodiments do not make restriction thereto.

Alternatively, as another example, another terminal apparatus may be a driving direction controller or a part of the driving direction controller and the driving direction controller may be a steering wheel. At this time, in S210, another terminal apparatus collects the movement data of a holding body of the terminal apparatus. In S220, another terminal apparatus determines whether the collected movement data satisfies the preset control condition. And in S230, when the movement data satisfies the fourth preset control condition, the fourth control instruction is generated. The fourth preset control condition may include: a movement track of the holding body is in an arc shape or a similar arc shape, and difference between radius of the arc or the similar arc and a preset radius does not exceed a preset threshold, wherein, the preset radius may be radius of the driving direction controller, and the embodiments do not make restriction thereto.

Thus, by collecting the user data, the terminal apparatus can recognize a driver to distinguish the driver from passengers, so as to be advantageous in providing better service to the driver.

At this time, the terminal apparatus may be the transport appliance driven by the user or a vehicle-mounted apparatus on the transport appliance. In particular, the terminal apparatus may be connected with other terminal apparatus, and the other terminal apparatus includes a driving power provider, a receiver and a controller. For example, the other terminal apparatus is a car, and the terminal apparatus is a vehicle-mounted apparatus. Alternatively, if the terminal apparatus includes a multimedia player and a volume controller, that is, the terminal apparatus is a vehicle-mounted playback apparatus, then the fourth control instruction may instruct the terminal apparatus to control volume played according to the fourth control instruction. For example, the fourth control instruction is for instructing the terminal apparatus to control the volume played in a range of volume played specified by the fourth control instruction. Thus, the user is made to hear the multimedia, e.g., the music played by the terminal apparatus clearly in procedure of driving, and potential safety hazard caused by being not able to recognize other sound clearly due to oversized volume of the multimedia played by the terminal apparatus can be avoided. Alternatively, as another example, if the terminal apparatus includes the SIM card and the microphone, that is, the terminal apparatus has the communication function, for example, the mobile phone or the tablet computer, then the fourth control instruction may instruct the terminal apparatus to set as mute mode or earphone mode. Wherein, in the earphone mode, the user is connected with the terminal apparatus through a wired or wireless earphone to communicate with other party of the communication. Thus, it can avoid potential danger on security caused by the user dialing phone call with hand during long time in procedure of driving.

Alternatively, the terminal apparatus is connected to or includes: a driving power provider for at least providing power to a movement of the terminal apparatus; a receiver for receiving the control instruction; and a controller for controlling the terminal apparatus according to the control instruction received by the receiver.

Alternatively, as another example, the control instruction is specifically for instructing the terminal apparatus to control power output parameter according to the control instruction.

Alternatively, as another example, in S110, collecting the user data in real time includes:

Collecting the physiological characteristic data of the user in real time;

Correspondingly, in S120, determining whether the collected user data satisfies the preset control condition includes:

Determining whether the physiological characteristic data collected satisfies the preset control condition, and the preset control condition indicates that the current physiological characteristic of the user is not suitable for controlling the driving power provider independently.

In S130, generating the control instruction if the user data satisfies the preset control condition includes:

Generating a control instruction of the power output parameter if it determines that the physiological characteristic data satisfies the preset control condition, and the control instruction of the power output parameter is for instructing the driving power provider to adjust power outputted from a current first value to a second value, wherein, the first value is larger than the second value; and/or instructing the driving power provider control the power outputted within a third value specified by the control instruction of the power output parameter.

Alternatively, as another example, in S110, collecting the user data in real time includes:

Collecting spatial parameter data of itself by sensing and using the collected spatial parameter data as the movement data of the user; and/or Collecting the physiological characteristic data of the user directly by sensing.

Therefore, according to the method for controlling terminal apparatus provided by the embodiment, by collecting the user data in real time to monitor the current status of the user actively and generating and transmitting the control instruction to the another terminal apparatus when the collected user data satisfies the preset control conditions to instruct the another terminal apparatus to execute the target operation. Thus, the terminal apparatus is able to execute the target operation according to the control instruction to make another terminal apparatus to satisfy the current requirement of the user without the instruction issued by the user, so as to improve the user experience.

The embodiments further provide a terminal apparatus including:

A sensing unit for collecting user data in real time;

A processing unit for determining whether the user data collected by the sensing unit satisfies a preset control condition, and generating a control instruction if it determines that the user data collected by the sensing unit satisfies the preset control condition, wherein, the control instruction is for instructing a second terminal apparatus to execute a target operation;

A transmitting unit for transmitting the control instruction to the second terminal apparatus by using a communication link with the second terminal apparatus, so that the second terminal apparatus is able to execute the target operation according to the control instruction.

Alternatively, the second terminal apparatus is connected to or includes:

A driving power providing unit for at least providing power to movement of the second terminal apparatus;

A receiving unit for receiving a control instruction;

A control unit for controlling the second terminal apparatus according to the control instruction received by the receiving unit.

Alternatively, as another example, the control instruction is specifically for instructing the second terminal apparatus to control power output parameter according to the control instruction.

Alternatively, as another example, the sensing unit is specifically for collecting physiological characteristic data of the user in real time;

The processor is specifically for determining whether the physiological characteristic data collected by the sensing unit satisfies the preset control condition, and the preset control condition indicates that current physiological characteristic of the user is not suitable for controlling the driving power provider independently;

The processor is further for generating a control instruction of the power output parameter if it determines that the physiological characteristic data satisfies the preset control condition, and the control instruction of the power output parameter is for instructing the driving power provider to adjust power outputted from a current first value to a second value, wherein, the first value is larger than the second value; and/or instructing the driving power provider to control the power outputted within a third value specified by the control instruction of the power output parameter.

The terminal apparatus may be for implementing flow and/or functions of the embodiment of the above-described method, and it is no longer described here for simplicity.

It should understand that, in the present disclosure, when it describes that a specific component is between a first component and a second component, there may also be or may not be some intermediate components between the specific component and the first component or the second component; when it describes that the specific component is connected to other components, the specific component may be connected to the other components directly without any intermediate components, or may not be connected to the other components directly with the intermediate components.

Based on the above-described technical solution, according to the terminal apparatus and the method for controlling terminal apparatus provided by the embodiments, by collecting the user data in real time with one terminal apparatus to monitor the current status of the user actively and generating and transmitting the control instruction to the another terminal apparatus when the collected user data satisfies the preset control conditions to instruct the another terminal apparatus to execute the target operation. Thus, another terminal apparatus is able to execute the target operation according to the control instruction to make another terminal apparatus to satisfy current requirement of the user without instruction issued by the user, so as to improve user experience.

With the progressive development of science and technique, the electronic technology has got fast development, and the kinds of the electronic product are more and more, people enjoys various kinds of convenience brought by the development of the science and technique. Now, people can enjoy comfortable life brought by the development of the science and technique through various kinds of the terminal apparatus. For example, the terminal apparatus such as a smart phone, a tablet computer or the like has become an important constituent part of human's life, the user can use the terminal apparatus such as the smart phone, the tablet computer or the like to listen to music or play games or the like, to relieve pressure brought by a fast paced life of the modern times.

At present, the terminal apparatus such as the smart phone or the like generally has a deep sleep mode, and when the deep sleep mode is turned on, only specified devices and applications in the smart phone are running, so as to save electric power. A user can turn on the deep sleep mode before going to sleep, and turn off the deep sleep mode after waking up.

In order to avoid turning on/off the deep sleep mode manually, period of turning on the deep sleep mode can be set, for example, from 10 pm to 6 am or the like, that is, the deep sleep mode is turned on at 10 pm and turned off at 6 am. However, times of going to sleep and waking up of the user are not fixed, for example, the user sometimes goes to sleep early, and sometimes wakes up late, and so on, thus, only turning on the deep sleep mode in fixed period cannot satisfy requirement of the user.

Therefore, there is a conventional technical problem of low intelligent degree in the terminal apparatus.

As explained in the above, in the terminal apparatus according to the first embodiment, the sensor 110 may be specifically for collecting the physiological characteristic data the physiological characteristic data of the user. Therefore, in order to solve the above-described conventional technical problem, the second embodiment to the ninth embodiment of this disclosure further provide a method for controlling terminal apparatus and a terminal apparatus, to improve intelligent degree of the terminal apparatus and satisfy the requirement of the user and provide a good user experience.

In order to achieve the above-described purpose, the technical solutions of the embodiments are implemented as follows:

In a first aspect, the embodiments provide a method for controlling terminal apparatus applied in a first terminal apparatus which is able to communicate with a second terminal apparatus, the method includes: obtaining a first physiological characteristic data for representing physiological characteristic of the user of the first terminal apparatus; determining current status of the user based on the first physiologic sign data; generating a control instruction for controlling the second terminal apparatus to enter a working mode corresponding to the status according to the status; transmitting the control instruction to the second terminal apparatus.

In a second aspect, the embodiments provide a method for controlling terminal apparatus applied in a second terminal apparatus which is able to communicate with the first terminal apparatus, the method includes: receiving a control instruction transmitted from the first terminal apparatus, wherein, the control instruction is determined based on a current status of the user after the first terminal apparatus determines the status according to first physiological characteristic data of the user of the first terminal apparatus; executing the control instruction to control the second terminal apparatus to enter a working mode corresponding to the status.

In a third aspect, the embodiments provide a terminal apparatus which is able to communicate with a second terminal apparatus, the terminal apparatus includes: a first obtaining unit for obtaining first physiological characteristic data for representing physiological characteristic of the user of the terminal apparatus; a first determining unit for determining a current status of the user based on the first physiologic sign data; a second determining unit for generating a control instruction for controlling the second terminal apparatus to enter a working mode corresponding to the status according to the status; a transmitting unit for transmitting the control instruction to the second terminal apparatus.

In a fourth aspect, the embodiments provide a terminal apparatus which is able to communicate with a first terminal apparatus, the terminal apparatus includes: a receiving unit for receiving a control instruction transmitted from the first terminal apparatus, wherein, the control instruction is determined based on a current status of the user after the first terminal apparatus determines the status according to first physiological characteristic data of the user of the first terminal apparatus; a control unit for executing the control instruction to control the terminal apparatus to which itself belongs to enter a working mode corresponding to the status.

It is known from the above that, in the method for controlling terminal apparatus and the terminal apparatus provided by the embodiments, after the first terminal apparatus obtains the first physiological characteristic data for representing physiological characteristic of the user, the first terminal apparatus determines the current status of the user according to the first physiological characteristic data, and generate the control instruction according to the status and transmits the control instruction to the second terminal apparatus, to control the second terminal apparatus to enter the working mode corresponding to the above-described status. For example, the first terminal apparatus can obtain the first physiological characteristic data such as current heart rate value, temperature value or the like of the user, determines that the user is in a sleeping status, and then generates the control instruction corresponding to the sleeping status, for example, an instruction for controlling the television enter a power-off working mode, and transmits the control instruction to the corresponding second terminal apparatus, i.e., the television, so that the television executes the control instruction to enter into the power-off working mode. Similarly, when the first terminal apparatus determines that the user is in a waking status, the first terminal apparatus may transmit a control instruction for controlling the television to power on, to control the television to power on. Thus, the working mode of the terminal apparatus does not need to be turned on or off manually by the user, which improves intelligent degree of the terminal apparatus and satisfies the requirement of the user and provides the good user experience.

Hereinafter, the technical solutions of the second embodiment to the ninth embodiment of this disclosure are described clearly and integrally in combination with FIG. 3 to FIG. 10.

The Second Embodiment:

The second embodiment provides a method for controlling terminal apparatus applied in a first terminal apparatus which is able to communicate with a second terminal apparatus.

In this embodiment, the first terminal apparatus may be for example a mobile apparatus such as a smart phone, a tablet computer, a multimedia player or the like, and may also a wearable type apparatus such as a smart hand ring, a smart watch, a smart glasses or the like. The second terminal apparatus may be for example a terminal such as the smart phone, the tablet computer, the multimedia player or the like, and may also be smart home appliance such as a smart television, a smart refrigerator, a smart air conditioning or the like.

Figure 3:
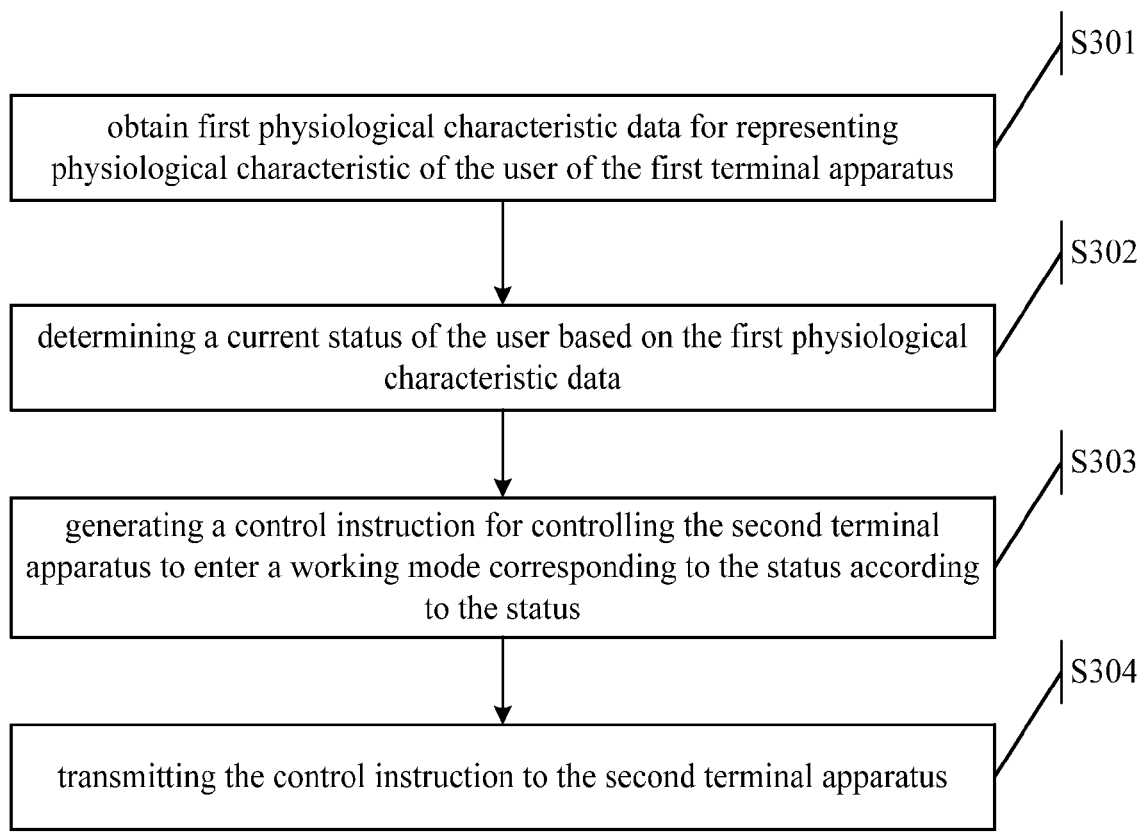
FIG. 3 is a schematic flow chart of a method for controlling terminal apparatus at a first terminal apparatus side provided in a second embodiment of the present disclosure.

FIG. 3 is a schematic flow chart of the method for controlling terminal apparatus at the first terminal apparatus side provided in a second embodiment, as shown in FIG. 3, the method includes:

S301: obtain first physiological characteristic data for representing physiological characteristic of the user of the first terminal apparatus;

In particular, the first terminal apparatus such as the smart hand ring is worn on wrist of the user, and the first physiological characteristic data of the user is detected to be obtained by one or more kinds of sensors provided on the first terminal apparatus.

In this embodiment, if it is detected by one kind of sensor, the above-described physiological characteristic data only includes one piece of parameter information, for example, the smart hand ring may obtain heart rate value of the user by a heart rate sensor provided thereon; or may obtain temperature value of the user by a temperature sensor provided thereon.

And if it is detected by several kinds of sensors, the above-described physiological characteristic data includes a plurality of pieces of parameter information, for example, the smart hand ring obtains the heart rate value and the temperature value of the user by the heart rate sensor and the temperature sensor, that is, obtains two pieces of parameter information.

Of course, the above-described first physiological characteristic data may be obtained by using other method, and this disclosure does not make any specific restriction.

In practical applications, the first physiological characteristic data may also be detected to be obtained by a third terminal apparatus such as a blood pressure instrument, a heart rate monitoring instrument or the like, and transmitted to the first terminal apparatus.

S302: determining a current status of the user based on the first physiological characteristic data;

In particular, a mapping relation between the physiological characteristic data of the user and the status of the user may be stored in the first terminal apparatus in advance, then, after obtaining the first physiological characteristic data, a status corresponding to the first physiological characteristic data, i.e., the current status of the user can be determined according to the mapping relation.

For example, the above-described mapping relation can be stored in form of a table. When the above-described physiological characteristic data only includes one piece of parameter information, for example, the heart rate value X, a plurality of heart rate value threshold corresponding to different status can be set. The mapping relation is shown in the following table 1. Wherein, when the heart rate value X is larger than or equal to a heart rate threshold $X1$, the user is in waking status; and when the heart rate value X is less than or equal to a heart rate threshold $X2$, the user is in sleeping status.

TABLE 1

| Heart rate value X (jump/minute) | Status of the user |
|---|---|
| $X \geq X1$ | Waking status |
| $X \leq X2$ | Sleeping status |

Then, after the first terminal apparatus detects to obtain that the heart rate value of the user is $X2$ by the heart rate sensor, according to the above table 1, it can determine that the user is in the sleeping status currently.

When the above-described physiological characteristic data includes a plurality of pieces of parameter information, for example, the heart rate value X and a temperature value Y, the mapping relation is shown in the following table 2. Wherein, when the heart rate value X is larger than or equal to the heart rate threshold $X1$ and the temperature value Y is larger than or equal to a temperature threshold $Y1$, the user is in the waking state; and when the heart rate value X is less than or equal to the heart rate threshold $X2$ and the temperature value Y is less than or equal to a temperature threshold $Y2$, the user is in the sleeping status.

TABLE 2

| Heart rate value X (jump/minute) | Temperature Y (° C.) | Status of the user |
|---|---|---|
| $X \geq X1$ | $Y \geq Y1$ | Waking status |
| $X \leq X2$ | $Y \leq Y2$ | Sleeping status |

Then, after the first terminal apparatus detects to obtain that the heart rate value of the user $X \leq X2$ by the heart rate sensor and detects to obtain that the temperature value of the user $Y \leq Y2$ by a temperature sensor, it can determine that the user is in the sleeping status currently according to the above table 2.

S303: generating a control instruction for controlling the second terminal apparatus to enter a working mode corresponding to the status according to the status;

In particular, the first terminal apparatus generates the control instruction corresponding to the current status of the user after determining the status. The control instruction here may be a single instruction, and may also be a set of a plurality of instructions. Then, when the first terminal apparatus generates a single control instruction, the control instruction may control one second terminal apparatus to enter into the working mode corresponding to the above-described current status of the user. And when the first terminal apparatus generates a plurality of control instructions, each of the control instruction may control one second terminal apparatus to enter into the working mode corresponding to the above-described current status of the user.

For example, the first terminal apparatus generates a single control instruction for controlling the television to enter into the power-off mode after determining that the user is in the sleeping status currently, and the control instruction can only control one second terminal apparatus, i.e., the television to enter into the power-off mode. And if two control instructions for controlling the television to enter into the power-off mode and controlling the air conditioning to enter into a sleeping mode are generated, these two control instructions can control the television to enter into the power-off mode and control the air conditioning to enter into the sleeping mode.

S304: transmitting the control instruction to the second terminal apparatus.

Hereto, the first terminal apparatus completes the flow of determining the current status of the user according to the physiological characteristic data of the user and controlling the second terminal apparatus to enter into the corresponding working mode according to the status.

It is known from the above that, the first terminal apparatus generates the control instruction according to the current status of the user after determining the status according to the first physiological characteristic data, and transmits the control instruction to the second terminal apparatus to control the second terminal apparatus to enter into the working mode corresponding to the above status. Thus, the working mode of the terminal apparatus does not need to be turned on or off manually by the user, so as to improve intelligent degree of the terminal apparatus and satisfy the requirement of the user and provide the good user experience.

The Third Embodiment:

The third embodiment provides a method for controlling terminal apparatus applied in a first terminal apparatus which is able to communicate with a second terminal apparatus.

In this embodiment, the first terminal apparatus may be for example a terminal apparatus such as a smart phone, a tablet computer, a multimedia player or the like, and may also a wearable type apparatus such as a smart hand ring, a smart watch, a smart glasses or the like. The second terminal apparatus may be for example a terminal such as the smart phone, the tablet computer, the multimedia player or the like, and may also be smart home appliance such as a smart television, a smart refrigerator, a smart air conditioning or the like.

Figure 4:
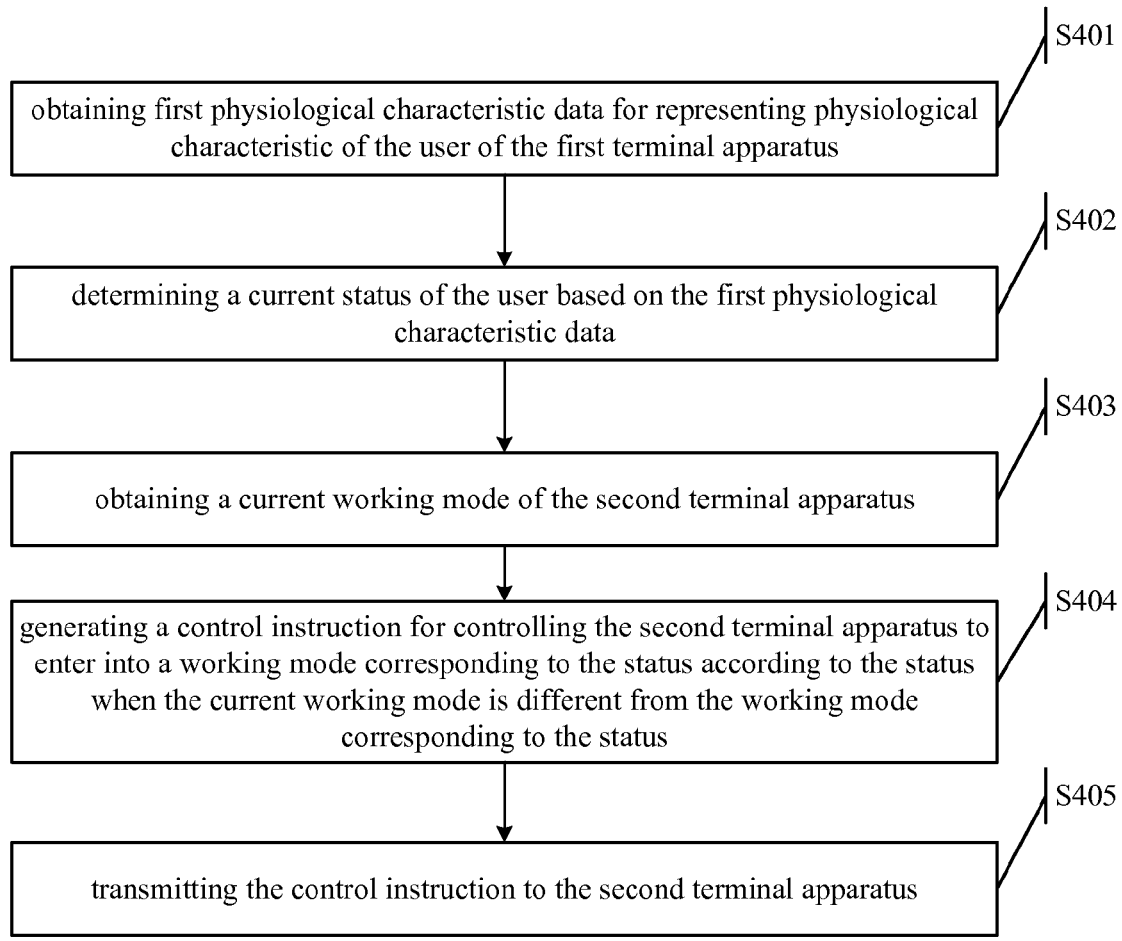
FIG. 4 is a schematic flow chart of a method for controlling terminal apparatus at the first terminal apparatus side provided in a third embodiment of the present disclosure.

FIG. 4 is a schematic flow chart of the method for controlling terminal apparatus at the first terminal apparatus side provided in the third embodiment, as shown in FIG. 4, the method includes:

S401: obtaining first physiological characteristic data for representing physiological characteristic of the user of the first terminal apparatus;

In particular, the first terminal apparatus such as the smart hand ring is worn on wrist of the user, and the first physiological characteristic data of the user is detected to be obtained by one or more kinds of sensors provided on the first terminal apparatus.

In this embodiment, if it is detected by one kind of sensor, the above-described physiological characteristic data only includes one piece of parameter information, for example, the smart hand ring may obtain heart rate value of the user by a heart rate sensor provided thereon; or may obtain temperature value of the user by a temperature sensor provided thereon.

And if it is detected by several kinds of sensors, the above-described physiological characteristic data includes a plurality of pieces of parameter information, for example, the smart hand ring obtains the heart rate value and the temperature value of the user by the heart rate sensor and the temperature sensor, that is, obtains two pieces of parameter information.

Of course, the above-described first physiological characteristic data may be obtained by using other method, and this disclosure does not make any specific restriction.

In practical applications, the first physiological characteristic data may also be detected to be obtained by a third terminal apparatus such as a blood pressure instrument, a heart rate monitoring instrument or the like, and transmitted to the first terminal apparatus.

S402: determining a current status of the user based on the first physiological characteristic data;

In particular, a mapping relation between the physiological characteristic data of the user and the status of the user may be stored in the first terminal apparatus in advance, then, after obtaining the first physiological characteristic data, a status corresponding to the first physiological characteristic data, i.e., the current status of the user can be determined according to the mapping relation.

For example, the above-described mapping relation can be stored in form of a table. When the above-described physiological characteristic data only includes one piece of parameter information, for example, a heart rate value X, a plurality of heart rate value threshold corresponding to different status can be set. The mapping relation is shown in the following table 1, wherein, when the heart rate value X is larger than or equal to a heart rate threshold X1, the user is in a waking status; and when the heart rate value X is less than or equal to a heart rate threshold X2, the user is in a sleeping status.

TABLE 1

| Heart rate value X (jump/minute) | Status of the user |
| --- | --- |
| $X \geq X1$ | Waking status |
| $X \leq X2$ | Sleeping status |

Then, after the first terminal apparatus detects to obtain that the heart rate value of the user is X2 by the heart rate sensor, according to the above table 1, it can determine that the user is in the sleeping status currently.

When the above-described physiological characteristic data includes a plurality of pieces of parameter information, for example, the heart rate value X and a temperature value Y, the mapping relation is shown in the following table 2. Wherein, when the heart rate value X is larger than or equal to the heart rate threshold X1 and the temperature value Y is larger than or equal to a temperature threshold Y1, the user is in the waking state; and when the heart rate value X is less than or equal to the heart rate threshold X2 and the temperature value Y is less than or equal to a temperature threshold Y2, the user is in the sleeping status.

TABLE 2

| Heart rate value X (jump/minute) | Temperature value Y (° C.) | Status of the user |
| --- | --- | --- |
| $X \geq X1$ | $Y \geq Y1$ | Waking status |
| $X \leq X2$ | $Y \leq Y2$ | Sleeping status |

Then, after the first terminal apparatus detects to obtain that the heart rate value of the user $X \leq X2$ by the heart rate sensor and detects to obtain that the temperature value of the user $Y \leq Y2$ by a temperature sensor, it can determine that the user is in the sleeping status currently according to the above table 2.

S403: obtaining a current working mode of the second terminal apparatus;

In particular, the first terminal apparatus can receive the current working mode transmitted by the second terminal apparatus, or may determine the current working mode of the second terminal apparatus by detecting environmental parameters of a surrounding environment, for example, the first terminal apparatus detects an environmental sound decibel number, and when the decibel number exceeds a threshold, the first terminal apparatus regards the second terminal apparatus, for example, a television as being in a power-on mode.

It needs to explain that in this embodiment, the above-described current working mode may be reported to the first terminal apparatus by the second terminal apparatus actively in a reporting period, or may be transmitted to the first terminal apparatus in response to a working mode inquiry request by the second terminal apparatus, wherein the working mode inquiry request is send to the second terminal apparatus by the first terminal apparatus at the same time of executing S401 and/or S402. Of course, there may be other ways, and this disclosure does not make any specific restriction.

Further, S403 is executed at the same time of executing S401 or S402 or between S401 and S402.

S404: generating a control instruction for controlling the second terminal apparatus to enter into a working mode corresponding to the status according to the status when the current working mode is different from the working mode corresponding to the status;

In particular, the first terminal apparatus may compare the working mode corresponding to the current status of the user in S402 with the current working mode after obtaining the current working mode of the second terminal apparatus and decide whether they are consistent, and if they are consistent, the flow is end; and if they are not consistent, the corresponding control instruction is generated according to the status determined in S402.

For example, after the first terminal apparatus compares the current working mode of the second terminal apparatus, i.e., power-on mode with the working mode corresponding to the status, i.e., power-off mode and determines that they are different working modes, the first terminal apparatus generates a single control instruction for controlling the television to enter into the power-off mode according to a current sleeping status of the user, and the control instruction can only control the second terminal apparatus, that is, the television enters into the power-off mode.

In another example, the first terminal apparatus may also generate a plurality of control instructions, and each of the control instruction may control one second terminal apparatus to enter into the working mode corresponding to the above-described current status of the user. And if two control instructions for controlling the television to enter into the power-off mode and controlling the air conditioning to enter into a sleeping mode are generated, these two control instructions can control the television to enter into the power-off mode and control the air conditioning to enter into the sleeping mode.

S405: transmitting the control instruction to the second terminal apparatus.

Hereto, the first terminal apparatus completes the flow of determining the current status of the user according to the physiological characteristic data of the user and controlling the second terminal apparatus to enter into the corresponding working mode according to the status.

It is known from the above that, the first terminal apparatus generates the control instruction according to the current status of the user after determining the status according to the first physiological characteristic data, and transmits the control instruction to the second terminal apparatus to control the second terminal apparatus to enter into the working mode corresponding to the above status. Thus, the working mode of the terminal apparatus does not need to be turned on or off manually by the user, so as to improve intelligent degree of the terminal apparatus and satisfy the requirement of the user and provide the good user experience.

The Fourth Embodiment:

The fourth embodiment provides a method for controlling terminal apparatus applied in a second terminal apparatus which is able to communicate with a first terminal apparatus, and the first terminal apparatus described here is consistent with the first terminal apparatus in the above-described one or more embodiments.

In this embodiment, the first terminal apparatus may be for example a terminal apparatus such as a smart phone, a tablet computer, a multimedia player or the like, and may also a wearable type apparatus such as a smart hand ring, a smart watch, a smart glasses or the like. The second terminal apparatus may be for example a terminal such as the smart phone, the tablet computer, the multimedia player or the like, and may also be smart home appliance such as a smart television, a smart refrigerator, a smart air conditioning or the like.

Figure 5:
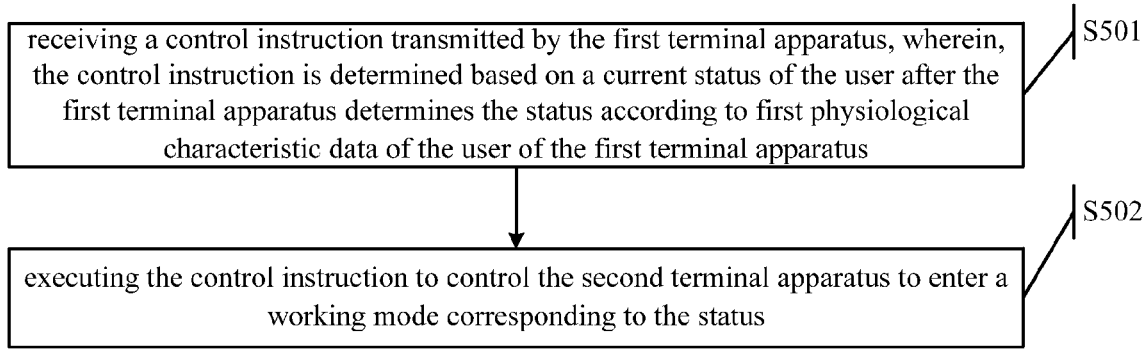
FIG. 5 is a schematic flow chart of a method for controlling terminal apparatus at a second terminal apparatus side provided in a fourth embodiment of the present disclosure.

FIG. 5 is a schematic flow chart of the method for controlling terminal apparatus at the second terminal apparatus side provided in the fourth embodiment, as shown in FIG. 5, the method includes:

S501: receiving a control instruction transmitted by the first terminal apparatus, wherein, the control instruction is determined based on a current status of the user after the first terminal apparatus determines the status according to first physiological characteristic data of the user of the first terminal apparatus;

In particular, the first terminal apparatus determines a corresponding to control instruction according to the current status of the user after determining the status according to the obtained first physiological characteristic data of the user, and transmits the instruction to the second terminal apparatus.

S502: executing the control instruction to control the second terminal apparatus to enter a working mode corresponding to the status.

For example, the first terminal apparatus determines that the user is in a sleeping status according to a heart rate value Y of the user, i.e., the first physiological characteristic data, and generates the control instruction, i.e., the instruction for controlling the television to enter into the power-off mode according to the sleeping status, and then transmits the control instruction to the second terminal apparatus, i.e., the television. And, the television receives and executes the control instruction to control itself to turn off to enter into the power-off mode.

Hereto, the second terminal apparatus completes a flow of receiving and executing the control instruction transmitted by the first terminal apparatus to control itself to enter into a corresponding working mode, wherein, the control instruction is a corresponding control instruction determined according to the current status of the user after determining the status according to the obtained first physiological characteristic data of the user and transmitted to the second terminal apparatus.

It is known from the above that, the first terminal apparatus generates the control instruction according to the current status of the user after determining the status according to the first physiological characteristic data, and transmits the control instruction to the second terminal apparatus to control the second terminal apparatus to enter into the working mode corresponding to the above status. Thus, the working mode of the terminal apparatus does not need to be turned on or off manually by the user, so as to improve intelligent degree of the terminal apparatus and satisfy the requirement of the user and provide the good user experience.

The Fifth Embodiment:

The fifth embodiment provides a method for controlling terminal apparatus applied in a second terminal apparatus which is able to communicate with a first terminal apparatus, and the first terminal apparatus described here is consistent with the first terminal apparatus in the above-described one or more embodiments.

In this embodiment, the first terminal apparatus may be for example a terminal apparatus such as a smart phone, a tablet computer, a multimedia player or the like, and may also a wearable type apparatus such as a smart hand ring, a smart watch, a smart glasses or the like. The second terminal apparatus may be for example a terminal such as the smart phone, the tablet computer, the multimedia player or the like, and may also be smart home appliance such as a smart television, a smart refrigerator, a smart air conditioning or the like.

In this embodiment, the second terminal apparatus has a first working mode and a second working mode. A power consumption when the second terminal apparatus is in the first working mode is lower than a power consumption when the second terminal apparatus is in the second working mode, for example, the first working mode is a normal mode and the second working mode is a low power consumption mode. Or, an information outputting mode when the second terminal apparatus is in the first working mode is different from an message stream mode when the second terminal apparatus is in the second working mode, for example, the first working mode is a vibration mode and the second working mode is a ring mode. Preferably, the first working mode is a power-on mode and the second working mode is a power-off mode.

In practical applications, both of the first working mode and the second working mode may be other modes. This disclosure does not make any specific restriction.

Figure 6:
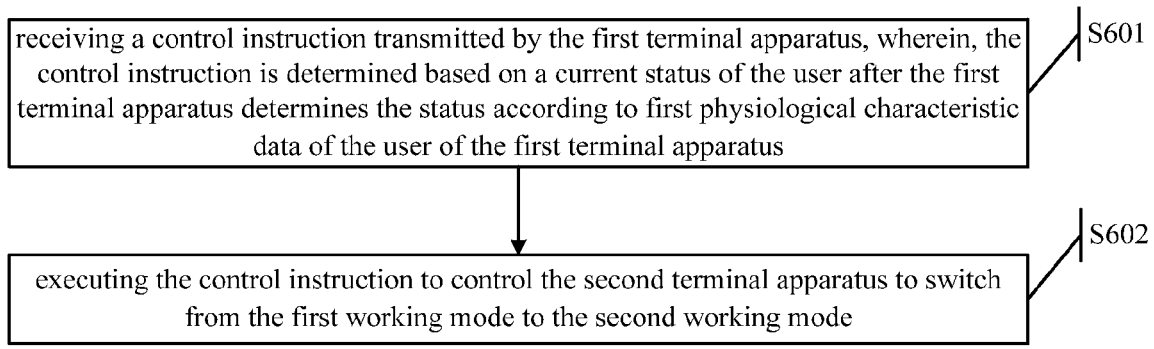
FIG. 6 is a schematic flow chart of a method for controlling terminal apparatus at the second terminal apparatus side provided in a fifth embodiment of the present disclosure.

FIG. 6 is a schematic flow chart of a method for controlling terminal apparatus at the second terminal apparatus side provided in the fifth embodiment, as shown in FIG. 6, the method includes:

S601: receiving a control instruction transmitted by the first terminal apparatus, wherein, the control instruction is determined based on a current status of the user after the first terminal apparatus determines the status according to first physiological characteristic data of the user of the first terminal apparatus;

In particular, when the second terminal apparatus is in the first working mode, the first terminal apparatus determines the corresponding control instruction according to the current status of the user after determining the status according to the obtained first physiological characteristic data of the user, and transmits the instruction to the second terminal apparatus, and the control instruction is an instruction for controlling the second terminal apparatus to enter into the second working mode.

S602: executing the control instruction to control the second terminal apparatus to switch from the first working mode to the second working mode.

In particular, the second terminal apparatus receives and executes the control instruction and controls itself to switch from the first working mode to the second working mode, for example, the second terminal apparatus executes the control instruction to switch from the normal working mode to the low power consumption working mode or from the vibration mode to the ring mode or from the power-on mode to the power-off mode.

Hereto, the second terminal apparatus completes a flow of receiving and executing the control instruction transmitted by the first terminal apparatus to control itself to switch from the first working mode to the second working mode, wherein, the second working mode is a working mode corresponding to the status of the user of the first terminal apparatus.

It is known from the above that, the first terminal apparatus generates the control instruction according to the current status of the user after determining the status according to the first physiological characteristic data, and transmits the control instruction to the second terminal apparatus to control the second terminal apparatus to enter into the working mode corresponding to the above status. Thus, the working mode of the terminal apparatus does not need to be turned on or off manually by the user, so as to improve intelligent degree of the terminal apparatus and satisfy the requirement of the user and provide the good user experience.

Sixth Embodiment:

The sixth embodiment provides a terminal apparatus which is able to communicate with a second terminal apparatus, and the second terminal apparatus described here is consistent with the second terminal apparatus in the above-described one or more embodiments.

In this embodiment, the terminal apparatus may be for example a terminal apparatus such as a smart phone, a tablet computer, a multimedia player or the like, and may also a wearable type apparatus such as a smart hand ring, a smart watch, a smart glasses or the like. The second terminal apparatus may be for example a terminal such as the smart phone, the tablet computer, the multimedia player or the like, and may also be smart home appliance such as a smart television, a smart refrigerator, a smart air conditioning or the like.

Figure 7:
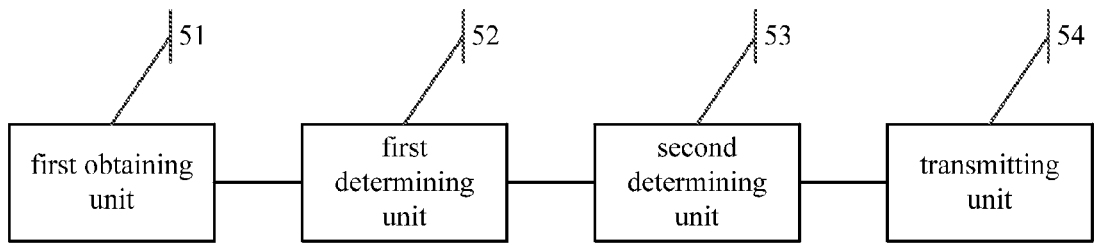
FIG. 7 is a schematic diagram of structure of the terminal apparatus provided in a six embodiment of the present disclosure.

FIG. 7 is a schematic diagram of structure of the terminal apparatus provided in the sixth embodiment. As shown in FIG. 7, the terminal apparatus includes: a first obtaining unit 51 for obtaining first physiological characteristic data for representing physiological characteristic of the user of terminal apparatus; a first determining unit 52 for determining a current status of the user based on the first physiological characteristic data; a second determining unit 53 for generating a control instruction for controlling the second terminal apparatus to enter into a working mode corresponding to the status according to the status; and a transmitting unit 54 for transmitting the control instruction to the second terminal apparatus.

The above first obtaining unit 51, first determining unit 52 and second determining unit 53 can be provided in a processor such as a CPU, a ARM, a single chip machine or the like, wherein, a function of the second determining unit 53 may be executed by the first determining unit 52. The transmitting unit 54 may be provided in a transmitter.

Further, those skilled in the art can understand that, the first obtaining unit 51 may be the sensor 101 in the terminal apparatus of the first embodiment, and the first determining unit 52 and the second determining unit 53 may be the processor 102 in the terminal apparatus of the first embodiment, and the transmitting unit 54 may be the transmitter 103 in the terminal apparatus of the first embodiment.

The Seventh Embodiment:

The seventh embodiment provides a terminal apparatus which is able to communicate with a second terminal apparatus, and the second terminal apparatus described here is consistent with the second terminal apparatus in the above-described one or more embodiments.

In this embodiment, the terminal apparatus may be for example a terminal apparatus such as a smart phone, a tablet computer, a multimedia player or the like, and may also a wearable type apparatus such as a smart hand ring, a smart watch, a smart glasses or the like. The second terminal apparatus may be for example a terminal such as the smart phone, the tablet computer, the multimedia player or the like, and may also be smart home appliance such as a smart television, a smart refrigerator, a smart air conditioning or the like.

Figure 8:
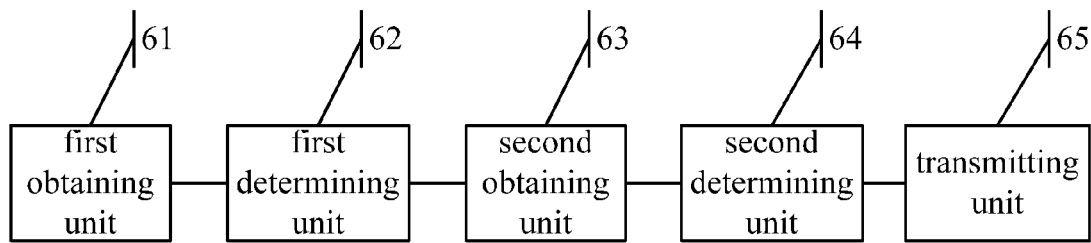
FIG. 8 is a schematic diagram of structure of the terminal apparatus provided in a seventh embodiment of the present disclosure.

FIG. 8 is a schematic diagram of structure of the terminal apparatus provided in the seventh embodiment. As shown in FIG. 8, the terminal apparatus includes: a first obtaining unit 61 for obtaining first physiological characteristic data for representing physiological characteristic of the user of terminal apparatus; a first determining unit 62 for determining a current status of the user based on the first physiological characteristic data; a second obtaining unit 63 for obtaining a current working mode of the second terminal apparatus; a second determining unit 64 for generating a control instruction for controlling the second terminal apparatus to enter into a working mode corresponding to the status at the time of determining that the current working mode is different from the working mode corresponding to the status; and a transmitting unit 65 for transmitting the control instruction to the second terminal apparatus.

Further, the second obtaining unit 63 is specifically for: receiving the current working mode transmitted by the second terminal apparatus; or determining the current working mode by detecting environmental parameters of a surrounding environment.

The above first obtaining unit 61, first determining unit 62, second obtaining unit 63 and second determining unit 64 can be provided in a processor such as a CPU, a ARM, a single chip machine or the like, wherein, a function of the second determining unit 64 may be executed by the first determining unit 62. The transmitting unit 64 may be provided in a transmitter.

Further, those skilled in the art can understand that, the first obtaining unit 61 and the second obtaining unit 63 may be the sensor 101 in the terminal apparatus of the first embodiment, and the first determining unit 62 and the second determining unit 64 may be the processor 102 in the terminal apparatus of the first embodiment, and the transmitting unit 65 may be the transmitter 103 in the terminal apparatus of the first embodiment.

The Eighth Embodiment:

The eighth embodiment provides a terminal apparatus which is able to communicate with a first terminal apparatus, and the first terminal apparatus described here is consistent with the first terminal apparatus in the above-described one or more embodiments.

In this embodiment, the first terminal apparatus may be for example a terminal apparatus such as a smart phone, a tablet computer, a multimedia player or the like, and may also a wearable type apparatus such as a smart hand ring, a smart watch, a smart glasses or the like. The second terminal apparatus may be for example a terminal such as the smart phone, the tablet computer, the multimedia player or the like, and may also be smart home appliance such as a smart television, a smart refrigerator, a smart air conditioning or the like.

Figure 9:
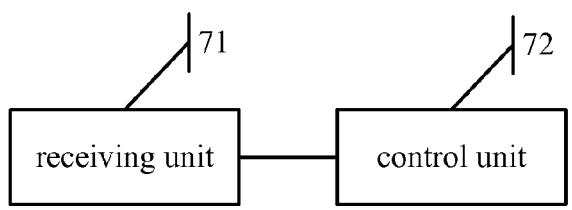
FIG. 9 is a schematic diagram of structure of the terminal apparatus provided in an eighth embodiment of the present disclosure.

FIG. 9 is a schematic diagram of structure of the terminal apparatus provided in the eighth embodiment, as shown in FIG. 9, the terminal apparatus includes: a receiving unit 71 for receiving a control instruction transmitted by the first terminal apparatus, wherein, the control instruction is determined based on a current status of the user by the first terminal apparatus after determining the status according to first physiological characteristic data of a user of the first terminal apparatus; a control unit 72 for executing the control instruction to control the terminal apparatus to which itself belongs to enter into a working mode corresponding to the status.

The above receiving unit 71 is provided in a receiver. The control unit 72 may be provided in a processor such as a CPU, an ARM, a single chip machine or the like.

Ninth Embodiment:

The ninth embodiment provides a terminal apparatus which is able to communicate with a first terminal apparatus, and the first terminal apparatus described here is consistent with the first terminal apparatus in the above-described one or more embodiments.

In this embodiment, the first terminal apparatus may be for example a terminal apparatus such as a smart phone, a tablet computer, a multimedia player or the like, and may also a wearable type apparatus such as a smart hand ring, a smart watch, a smart glasses or the like. The second terminal apparatus may be for example a terminal such as the smart phone, the tablet computer, the multimedia player or the like, and may also be smart home appliance such as a smart television, a smart refrigerator, a smart air conditioning or the like.

Figure 10:
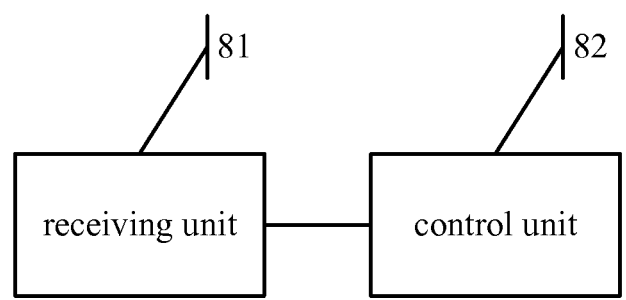
FIG. 10 is a schematic diagram of structure of the terminal apparatus provided in a ninth embodiment of the present disclosure.

FIG. 10 is a schematic diagram of structure of the terminal apparatus provided in the ninth embodiment, as shown in FIG. 10, the terminal apparatus includes: a receiving unit 81 for receiving a control instruction transmitted by the first terminal apparatus, wherein, the control instruction is determined based on a current status of the user by the first terminal apparatus after determining the status according to first physiological characteristic data of a user of the first terminal apparatus; a control unit 82 for executing the control instruction to control the terminal apparatus to which itself belongs to switch from a first working mode to a second working mode, wherein, the second working mode is a working mode corresponding to the status.

Further, a power consumption when the second terminal apparatus is in the first working mode is lower than a power consumption when the second terminal apparatus is in the second working mode; or, an information outputting mode when the second terminal apparatus is in the first working mode is different from an information outputting mode when the second terminal apparatus is in the second working mode.

Further, the first working mode is a power-on mode and the second working mode is a power-off mode.

As explained in the above, the method for controlling terminal apparatus and the terminal apparatus on the second embodiment to the ninth embodiment of this disclosure is actually specific applications of the terminal apparatus and the control method thereof according to the first embodiment of this disclosure. Wherein, the user data is the physiological characteristic data for representing the physiological characteristic of the user of the terminal apparatus, determining whether the user data satisfies the preset control condition is determining the current status of the user, and controlling the second terminal apparatus to execute the target operation is controlling the second terminal apparatus to enter into the working mode corresponding to the current status of the user.

In summary, the terminal apparatus and the control method thereof according to the embodiments can be configured as follows:

(1) A terminal apparatus including:

A sensor for collecting user data in real time;

A processor for determining whether the user data collected by the sensor satisfies a preset control condition, and generating a control instruction if it determines that the user data collected by the sensor satisfies the preset control condition, wherein, the control instruction is for instructing a second terminal apparatus to execute a target operation; and A transmitter for transmitting the control instruction to the second terminal apparatus by using a communication link with the second terminal apparatus, so that the second terminal apparatus is able to execute the target operation according to the control instruction.

(2) The terminal apparatus according to the above (1), wherein, the second terminal apparatus is connected to or includes:

A driving power provider for at least providing power to a movement of the second terminal apparatus;

A receiver for receiving the control instruction;

A controller for controlling the second terminal apparatus according to the control instruction received by the receiver.

(3) The terminal apparatus according to the above (2), wherein, the control instruction is specifically for instructing the second terminal apparatus to control power output parameter according to the control instruction.

(4) The terminal apparatus according to the above (3), wherein, the sensor is specifically for collecting physiological characteristic data of the user in real time;

The processor is specifically for determining whether the physiological characteristic data collected by the sensor satisfies the preset control condition, and the preset control condition indicating that current physiological characteristic of the user is not suitable for controlling the driving power provider independently;

The processor is further for generating a control instruction of the power output parameter if it determines that the physiological characteristic data satisfies the preset control condition, and the control instruction of the power output parameter is for instructing the driving power provider to adjust power outputted from a current first value to a second value, wherein, the first value is larger than the second value; and/or instructing the driving power provider to control the power outputted within a third value specified by the control instruction of the power output parameter.

(5) The terminal apparatus according to any one of the above (1) to (4), wherein, the terminal apparatus includes: a core piece and a fixing piece, wherein, the sensor, the processor and the transmitter are provided in the fixing piece and/or the core piece, and the fixing piece is for maintaining a relative position relationship between the core piece and at least a part of body of the user.

(6) The terminal apparatus according to the above (5), wherein, the fixing piece at least has a fixing status, and in the fixing status, the fixing piece is able to be as at least a part of an annular space or at least a part of approximate annular space satisfying a first predetermined condition, the annular space or the approximate annular space is able to surround periphery of a columnar body satisfying a second predetermined condition.

(7) The terminal apparatus according to any one of the above (1) to (6), wherein, the sensor includes:

A first sensor for collecting spatial parameter data of the terminal apparatus by sensing and using the collected spatial parameter data as movement data of the user; and/or A second sensor provided on a side facing the user and for collecting the physiological characteristic data of the user directly by sensing.

(8) The terminal apparatus according to the above (1), wherein,

The sensor is specifically for collecting first physiological characteristic data for representing physiological characteristic of the user of the terminal apparatus in real time;

The processor specifically includes:

A first determining unit for determining a current status of the user based on the first physiologic sign data;

A second determining unit for generating a control instruction for controlling the second electronic apparatus to enter into a working mode corresponding to the status according to the status.

(9) The terminal apparatus according to the above (8), wherein,

The sensor further includes:

A second obtaining unit for obtaining a current working mode of the second electronic apparatus before generating the control instruction according to the status;

The second determining unit is specifically for generating the control instruction according to the status when it determines that the current working mode is different from a working mode corresponding to the status.

(10) The terminal apparatus according to the above (9), wherein,

The second obtaining unit is specifically for:

Receiving the current working mode transmitted by the second electronic apparatus; or Determining the current working mode by detecting environmental parameters of a surrounding environment.

(11) A method for controlling terminal apparatus including:

Collecting user data in real time;

Determining whether the collected user data satisfies a preset control condition;

Generating a control instruction if the user data satisfies the preset control condition, wherein, the control instruction is for instructing the terminal apparatus to execute a target operation; and Transmitting the control instruction to the terminal apparatus by using a communication link with the terminal apparatus, so that the terminal apparatus is able to execute the target operation according to the control instruction.

(12) The method according to the above (11), wherein, the terminal apparatus is connected to or includes:

A driving power provider for at least providing power to a movement of the terminal apparatus;

A receiver for receiving the control instruction;

A controller for controlling the terminal apparatus according to the control instruction received by the receiver.

(13) The method according to the above (11), wherein, the control instruction is specifically for instructing the terminal apparatus to control power output parameter according to the control instruction.

(14) The method according to the above (13), wherein, collecting the user data in real time includes:

Collecting physiological characteristic data of the user in real time;

Determining whether the collected user data satisfies the preset control condition includes:

Determining whether the collected physiological characteristic data satisfies the preset control condition, and the preset control condition indicating that the current physiological characteristic of the user is not suitable for controlling a driving power provider independently;

Generating the control instruction if the user data satisfies the preset control condition includes:

Generating a control instruction of the power output parameter if it determines that the physiological characteristic data satisfies the preset control condition, and the control instruction of the power output parameter is for instructing the driving power provider to adjust power outputted from a current first value to a second value, wherein, the first value is larger than the second value; and/or instructing the driving power provider to control the power outputted within a third value specified by the control instruction of the power output parameter.

(15) The method according to any one of the above (11) to (14), wherein collecting the user data in real time includes:

Collecting spatial parameter data of itself by sensing and using the collected spatial parameter data as movement data of the user; and/or Collecting the physiological characteristic data of the user directly by sensing.

(16) The method according to the above (11) applied in a second terminal apparatus which is able to communicate with the terminal apparatus, Collecting the user data in real time is specifically:

Collecting first physiological characteristic data for representing physiological characteristic of a user of the second terminal apparatus in real time;

Determining whether the collected user data satisfies the preset control condition is specifically:

Determining a current status of the user based on the first physiological characteristic data; and The control instruction is specifically for instructing the second terminal apparatus to enter into a working mode corresponding to the status.

(17) The method according to the above (16), wherein, before generating the control instruction, the method further includes:

Obtaining a current working mode of the second electronic apparatus;

Generating the control instruction if the user data satisfies the preset control condition is specifically:

Generating the control instruction according to the status when it determines that the current working mode is different from a working mode corresponding to the status.

(18) The method according to the above (17), wherein, obtaining the current working mode of the second electronic apparatus includes:

Receiving the current working mode transmitted by the second electronic apparatus; or, Determining the current working mode by detecting environmental parameters of a surrounding environment.

(19) The method according to the above (11),

Wherein, the user data is first physiological characteristic data for representing physiological characteristic of a user of a second terminal apparatus which is able to communicate with the terminal apparatus;

The control instruction is determined based on the current status of the user after determining the status according to the first physiological characteristic data of the user of the second terminal apparatus;

And the control instruction is for controlling the terminal apparatus to enter into a working mode corresponding to the status.

(20) The method according to the above (19), wherein, the terminal apparatus executing the target operation according to the control instruction is specifically:

The terminal apparatus switching from a first working mode to a second working mode according to the control instruction, wherein, the second working mode is the working mode corresponding to the status.

(21) The method according to the above (20), wherein, a power consumption when the terminal apparatus is in the first working mode is lower than a power consumption when the terminal apparatus is in the second working mode; Or, An information outputting mode when the terminal apparatus is in the first working mode is different from an information outputting mode when the terminal apparatus is in the working mode.

(22) The method according to the above (21), wherein, the first working mode is a power-on mode and the second working mode is a power-off mode.

(23) A terminal apparatus which is able to communicate with a second terminal apparatus, the terminal apparatus includes:

A receiving unit for receiving a control instruction transmitted by the second terminal apparatus, wherein, the control instruction is determined based on a current status of the user by the second terminal apparatus after determining the status according to first physiological characteristic data of a user of the second terminal apparatus; and A control unit for executing the control instruction to control the terminal apparatus to which itself belongs to enter into a working mode corresponding to the status.

(24) The terminal apparatus according to the above (23), wherein, the control unit is specifically for executing the control instruction to control the terminal apparatus to which itself belongs to switch from a first working mode to a second working mode, wherein, the second working mode is the working mode corresponding to the status.

(25) The terminal apparatus according to the above (24), wherein, a power consumption when the terminal apparatus is in the first working mode is lower than a power consumption when the terminal apparatus is in the second working mode; or, an information outputting mode when the terminal apparatus is in the first working mode is different from an information outputting mode when the terminal apparatus is in the working mode.

(26) The terminal apparatus according to the above (24), wherein, the first working mode is a power-on mode and the second working mode is a power-off mode.

The respective embodiments are described detailed above. However, those skilled in the art should understand, these embodiments can be made various modifications, combination or sub-combination without departing from the principle and spirit of the present disclosure, and such modification should fall into the range of the present disclosure.

Those skilled in the art should understand that, the embodiments can be provided as method, system or computer program product. Therefore, the present disclosure can adopt forms of full hardware embodiment, full software embodiment, or embodiment combining software and hardware aspects. Further, any combination of one or more computer readable medium(s) may be utilized by the present disclosure. The computer readable medium may be a computer readable signal medium or a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wire line, optical fiber cable, RF, etc., or any suitable combination of the foregoing.

Computer program code for carrying out operations for aspects of the present disclosure may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In case of relating to a remote computer, the remote computer may be connected to the user's computer through any type of network, including a local area network (LAN) or a wide area network (WAN), or the connection may be made to an external computer (for example, through the Internet using an Internet Service Provider).

The present disclosure is described by referring to flow chart and/or block diagram of method, apparatus (system) and computer program product according to the embodiments. It should understand that each flow and/or block in the flow chart and/or block diagram and the combination of the flow and/or block in the flow chart and/or block diagram can be implemented by computer program instruction. These computer program instruction can be provided to processors of a general purpose computer, a dedicated computer, an embedded processor or other programmable data processing apparatus to generate a machine, so that a device for implementing functions specified in one or more flow of the flow chart and/or one or more block of the block diagram is generated by the instruction executed by the processor of the computer or other programmable.

These computer program instruction can also be stored in computer readable storage which is able to direct the computer or other programmable data processing apparatus to operate in specific manners, so that the instruction stored in the computer readable storage generates manufactured article including commander equipment, the commander equipment implements functions specified by one or more flow in the flow chart and/or one or more block in the block diagram.

These computer program instruction can be loaded to computer or other programmable data processing apparatus, so that a series of operation steps are executed on the computer or other programmable apparatus to generate computer implemented process, so that the instruction executed on the computer or other programmable apparatus provide steps for implementing functions specified in one or more flow of the flow chart and/or one or more block of the block diagram.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect of the present disclosure, an application may be deployed for performing one or more aspects of the present disclosure. As one example, the deploying of an application comprises providing computer infrastructure operable to perform one or more aspects of the present disclosure.

As a further aspect of the present disclosure, a computing infrastructure may be deployed comprising integrating computer readable code into a computing system, in which the code in combination with the computing system is capable of performing one or more aspects of the present disclosure.

As yet a further aspect of the present disclosure, a process for integrating computing infrastructure comprising integrating computer readable code into a computer system may be provided. The computer system comprises a computer readable medium, in which the computer medium comprises one or more aspects of the present disclosure. The code in combination with the computer system is capable of performing one or more aspects of the present disclosure.

Further, it needs to note that, in the specification, terms "comprise", "include" and any other variation thereof intends to cover nonexclusive inclusion so that the procedure, the method, the product or the equipment including a series of elements not only includes these elements, but also include other elements which are not listed explicitly, or also include inherent elements of these procedure, method, product or equipment. In case that there is no more limitation, the element defined by a statement "including one . . . " does not exclude there is additional same element in the procedure, method, article or apparatus including the element.

The corresponding structures, materials, acts, and equivalents of all means or step plus function elements in the claims below, if any, are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A terminal apparatus comprising:
a sensor for collecting physiological characteristic user data in real time;
a processor for determining whether the user data collected by the sensor satisfies a preset control condition, and generating a control instruction if it determines that the user data collected by the sensor satisfies the preset control condition, wherein, the control instruction is for instructing a second terminal apparatus to execute a target operation; and
a transmitter for transmitting the control instruction to the second terminal apparatus by using a communication link with the second terminal apparatus, so that the second terminal apparatus is able to execute the target operation according to the control instruction,
wherein the second terminal apparatus is connected to or includes:
a driving power provider for at least providing power to a movement of the second terminal apparatus;
a receiver for receiving the control instruction; and
a controller for controlling the second terminal apparatus according to the control instruction received by the receiver; and
wherein the control instruction instructs the second terminal apparatus to control power output parameter according to the control instruction.

2. The terminal apparatus according to claim 1, wherein the processor determines whether the physiological characteristic data collected by the sensor satisfies the preset control condition, and the preset control condition indicates that a current physiological characteristic of the user is not suitable for controlling the driving power provider independently; and
the processor generates a control instruction of the power output parameter if it determines that the physiological characteristic data satisfies the preset control condition, and the control instruction of the power output parameter instructs the driving power provider to adjust power outputted from a current first value to a second value, wherein, the first value is larger than the second value; and/or instructs the driving power provider to control the power outputted within a third value specified by the control instruction of the power output parameter.

3. The terminal apparatus according to claim 1, wherein the terminal apparatus comprises a core piece and a fixing piece, wherein the sensor, the processor, and the transmitter are provided in the fixing piece and/or the core piece, and the fixing piece maintains a relative position relationship between the core piece and at least a part of body of the user.

4. The terminal apparatus according to claim 3, wherein the fixing piece at least has a fixing status, and in the fixing status, the fixing piece is able to be as at least a part of an annular space or at least a part of approximate annular space satisfying a first predetermined condition, the annular space or the approximate annular space is able to surround periphery of a columnar body satisfying a second predetermined condition.

5. The terminal apparatus according to claim 1, wherein the sensor comprises:
    a first sensor for collecting spatial parameter data of the terminal apparatus by sensing and using the collected spatial parameter data as movement data of the user; and/or
    a second sensor provided on a side facing the user and for collecting a physiological characteristic data of the user directly by sensing.

6. The terminal apparatus according to claim 1, wherein the sensor collects first physiological characteristic data for representing physiological characteristic of the user of the terminal apparatus in real time; and the processor includes:
    a first determining unit for determining a current status of the user based on the first physiologic sign data; and
    a second determining unit for generating a control instruction for controlling the second electronic apparatus to enter into a working mode corresponding to the status according to the status.

7. The terminal apparatus according to claim 6, wherein the sensor further includes:
    a second obtaining unit obtaining a current working mode of the second electronic apparatus before generating the control instruction according to the status; and
    the second determining unit generates the control instruction according to the status when it determines that the current working mode is different from a working mode corresponding to the status.

8. The terminal apparatus according to claim 7, wherein the second obtaining unit receives the current working mode transmitted by the second electronic apparatus; or determines the current working mode by detecting environmental parameters of a surrounding environment.

9. A method for controlling a terminal apparatus comprising:
    collecting physiological characteristic user data in real time;
    determining whether the collected physiological characteristic user data satisfies a preset control condition;
    generating a control instruction if the physiological characteristic user data satisfies the preset control condition, wherein, the control instruction is for instructing the terminal apparatus to execute a target operation; and
    transmitting the control instruction to the terminal apparatus by using a communication link with the terminal apparatus, so that the terminal apparatus is able to execute the target operation according to the control instruction.,
    wherein the terminal apparatus is connected to or includes:
        a driving power provider for at least providing power to a movement of the terminal apparatus;
        a receiver for receiving the control instruction; and
        a controller for controlling the terminal apparatus according to the control instruction received by the receiver and
    wherein the control instruction instructs the terminal apparatus to control power output parameter according to the control instruction.

10. The method according to claim 9, wherein, collecting the physiological characteristic user data in real time comprises:
    determining whether the collected physiological characteristic user data satisfies the preset control condition comprising:
    determining whether the collected physiological characteristic data satisfies the preset control condition, and the preset control condition indicating that the current physiological characteristic of the user is not suitable for controlling a driving power provider independently; and
    generating the control instruction if the physiological characteristic user data satisfies the preset control condition comprises:
    generating a control instruction of the power output parameter if it determines that the physiological characteristic data satisfies the preset control condition, and the control instruction of the power output parameter is for instructing the driving power provider to adjust power outputted from a current first value to a second value, wherein, the first value is larger than the second value; and/or instructing the driving power provider to control the power outputted within a third value specified by the control instruction of the power output parameter.

11. The method according to claim 9 applied in a second terminal apparatus that is able to communicate with the terminal apparatus and collecting the physiological characteristic user data in real time includes:
    collecting first physiological characteristic data for representing physiological characteristic of a user of the second terminal apparatus in real time;
    determining whether the collected physiological characteristic user data satisfies the preset control condition includes:
    determining a current status of the user based on the first physiological characteristic data; and
    the control instruction instructs the second terminal apparatus to enter into a working mode corresponding to the status.

12. The method according to claim 9, wherein
    the physiological characteristic user data is first physiological characteristic data for representing physiological characteristic of a user of a second terminal apparatus that is able to communicate with the terminal apparatus;
    the control instruction is determined based on the current status of the user after determining the status according to the first physiological characteristic data of the user of the second terminal apparatus; and the control instruction is for controlling the terminal apparatus to enter into a working mode corresponding to the status.

* * * * *